United States Patent
Lococo

(10) Patent No.: US 11,284,966 B2
(45) Date of Patent: Mar. 29, 2022

(54) APPARATUS AND METHOD FOR PERFORMING IMPLANTS

(71) Applicant: Stemmed Implant Technology Inc., Niagara Falls (CA)

(72) Inventor: Michael P. Lococo, Niagara Falls (CA)

(73) Assignee: Stemmed Implant Technology Inc., Niagara Falls (CA)

( * ) Notice: Subject to any disclaimer, the term of this patent is extended or adjusted under 35 U.S.C. 154(b) by 0 days.

(21) Appl. No.: 15/112,892

(22) PCT Filed: Jan. 20, 2015

(86) PCT No.: PCT/CA2015/000034
§ 371 (c)(1),
(2) Date: Jul. 20, 2016

(87) PCT Pub. No.: WO2015/106347
PCT Pub. Date: Jul. 23, 2015

(65) Prior Publication Data
US 2016/0346062 A1 Dec. 1, 2016

Related U.S. Application Data

(60) Provisional application No. 61/929,465, filed on Jan. 20, 2014.

(51) Int. Cl.
*A61C 9/00* (2006.01)
*A61C 1/08* (2006.01)
(Continued)

(52) U.S. Cl.
CPC .............. *A61C 1/084* (2013.01); *A61C 1/088* (2013.01); *A61C 8/0036* (2013.01);
(Continued)

(58) Field of Classification Search
CPC ...... A61C 1/084; A61C 8/0089; A61C 9/0006
(Continued)

(56) References Cited

U.S. PATENT DOCUMENTS 3,834,025 A * 9/1974 Schunemann ....... A61C 9/0006
433/37
3,895,444 A * 7/1975 Small .................... A61C 1/084
433/174
(Continued)

FOREIGN PATENT DOCUMENTS

CA 1118242 A1 2/1982
CA 1132814 A1 10/1982
(Continued)

OTHER PUBLICATIONS

Pearson Dental, "Glenroe Disposable Trays", 2014 (https://www.pearsondentalcom/catalog/product.asp?majcatid=24&catid=2630&pid=64995&subcatid=67).
(Continued)

*Primary Examiner* — Ralph A Lewis
(74) *Attorney, Agent, or Firm* — Bereskin & Parr LLP/S.E.N.C.R.L, s.r.l.; Tony Orsi; Callum Lootsma

(57) ABSTRACT

Various embodiments described herein generally relate to apparatuses and methods for performing bone implants such as, but not limited to, dental implants, knee and joint replacements, and various types of bone anchored prosthesis. For a better understanding of how the various apparatus and methods can be used for bone implants, an example will be given herein with respect to dental implants.

22 Claims, 22 Drawing Sheets

(51) Int. Cl.
*A61C 19/04* (2006.01)
*A61C 8/00* (2006.01)
*A61C 11/00* (2006.01)
*A61C 13/08* (2006.01)
*A61C 13/34* (2006.01)

(52) U.S. Cl.
CPC .......... *A61C 8/0089* (2013.01); *A61C 9/0006* (2013.01); *A61C 11/00* (2013.01); *A61C 13/081* (2013.01); *A61C 13/34* (2013.01); *A61C 19/04* (2013.01)

(58) Field of Classification Search
USPC .......................................................... 433/75
See application file for complete search history.

(56) References Cited

U.S. PATENT DOCUMENTS

| | | | | |
|---|---|---|---|---|
| 4,085,507 | A * | 4/1978 | Lehn | A61C 9/0006 433/37 |
| 5,133,660 | A * | 7/1992 | Fenick | A61B 6/14 433/173 |
| 5,190,457 | A * | 3/1993 | Schreinemakers | A61C 9/0006 433/214 |
| 5,316,474 | A * | 5/1994 | Robertson | A61C 9/0006 433/37 |
| 5,340,308 | A | 8/1994 | Cukjati | |
| 5,513,985 | A * | 5/1996 | Robertson | A61C 9/0006 433/37 |
| 5,520,539 | A * | 5/1996 | Divjak | A61C 9/0006 433/37 |
| 5,556,278 | A | 9/1996 | Meitner | |
| 5,636,985 | A * | 6/1997 | Simmen | A61C 9/0006 433/37 |
| 5,733,118 | A | 3/1998 | Pankuch et al. | |
| 5,927,982 | A | 7/1999 | Kruger | |
| 5,967,777 | A * | 10/1999 | Klein | A61C 1/084 433/75 |
| 6,213,768 | B1 * | 4/2001 | Wright | A61C 9/0006 433/37 |
| 6,227,852 | B1 | 5/2001 | Schedler et al. | |
| 6,450,808 | B1 | 9/2002 | Pelerin | |
| 7,086,860 | B2 | 8/2006 | Schuman et al. | |
| 7,361,019 | B2 | 4/2008 | Autran et al. | |
| 7,654,823 | B2 * | 2/2010 | Dadi | A61C 1/084 433/173 |
| 2004/0009451 | A1 | 1/2004 | Skinner | |
| 2004/0241606 | A1 * | 12/2004 | Diesso | A61C 9/0006 433/37 |
| 2005/0069835 | A1 * | 3/2005 | Bompard | A61C 1/084 433/76 |
| 2005/0100855 | A1 | 5/2005 | Gittleman | |
| 2006/0068357 | A1 * | 3/2006 | Paradiso | A61C 9/0006 433/39 |
| 2006/0088799 | A1 * | 4/2006 | Dorfman | A61C 9/0006 433/38 |
| 2009/0291416 | A1 * | 11/2009 | Brunson | A61C 9/0006 433/215 |
| 2010/0203478 | A1 * | 8/2010 | Rubbert | A61C 8/0036 433/212.1 |
| 2010/0323320 | A1 * | 12/2010 | Takebayashi | A61C 1/084 433/75 |
| 2011/0033820 | A1 * | 2/2011 | Duncan | A61C 1/084 433/76 |
| 2011/0045432 | A1 * | 2/2011 | Groscurth | A61C 1/084 433/75 |
| 2011/0123946 | A1 * | 5/2011 | Bulloch | A61C 1/084 433/75 |
| 2012/0148978 | A1 | 6/2012 | Suchan et al. | |
| 2013/0203009 | A1 * | 8/2013 | Mutsafi | A61C 8/0001 433/27 |
| 2013/0209953 | A1 | 8/2013 | Arlinsky et al. | |
| 2013/0224680 | A1 * | 8/2013 | McDonald | A61C 9/0006 433/38 |
| 2013/0230824 | A1 * | 9/2013 | Marumori | A61C 9/0006 433/36 |
| 2013/0230827 | A1 * | 9/2013 | Kwon | A61C 3/02 433/183 |
| 2013/0260330 | A1 * | 10/2013 | Marumori | A61C 9/0006 433/36 |
| 2013/0260331 | A1 * | 10/2013 | Marumori | A61C 9/0006 433/36 |
| 2013/0260337 | A1 | 10/2013 | Duncan | |
| 2013/0286174 | A1 * | 10/2013 | Urakabe | A61B 1/00009 348/66 |
| 2015/0359479 | A1 * | 12/2015 | Crandall | A61B 6/145 433/29 |

FOREIGN PATENT DOCUMENTS

| | | |
|---|---|---|
| EP | 1421915 A1 | 5/2004 |
| EP | 1587458 B1 | 3/2008 |
| FR | 2924920 A1 | 6/2009 |
| WO | 2004062535 A2 | 7/2004 |
| WO | 2015106347 A1 | 7/2015 |

OTHER PUBLICATIONS

International Preliminary Report on Patentability dated Aug. 4, 2016 in corresponding International Patent Application No. PCT/CA2015/000034.

Bondic pages from website, printed Dec. 23, 2014 (http://notaglue.com).

* cited by examiner

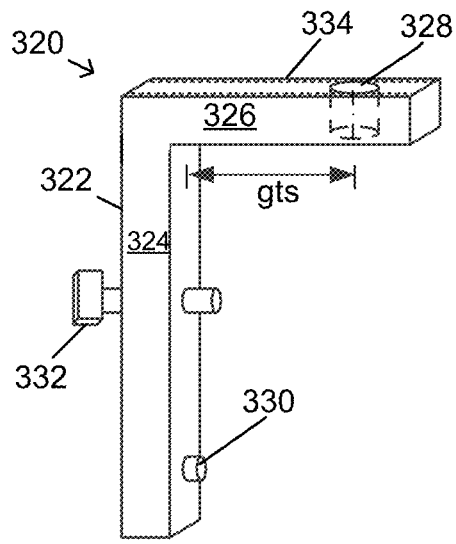
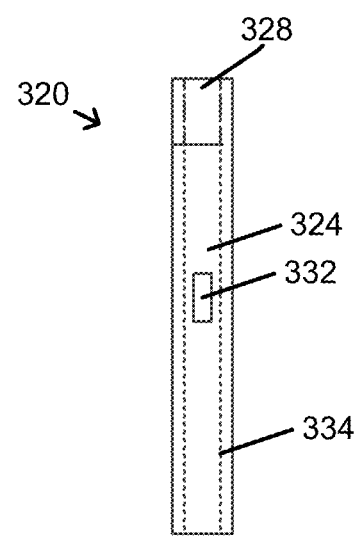
FIG. 8A
FIG. 8B
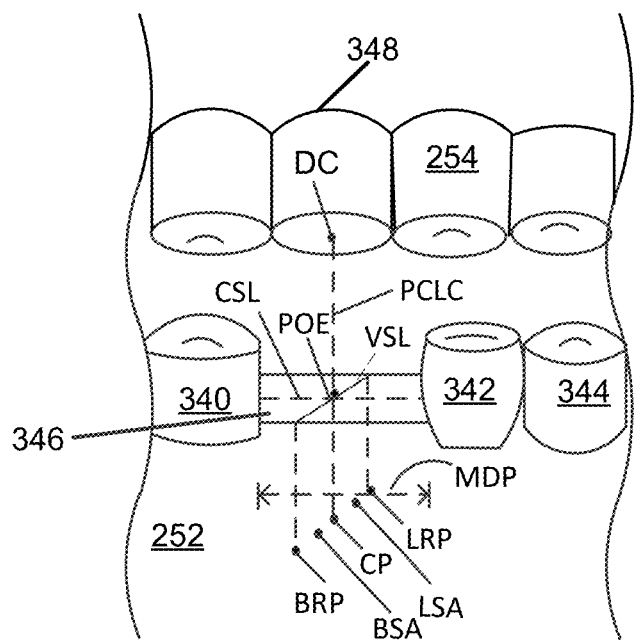
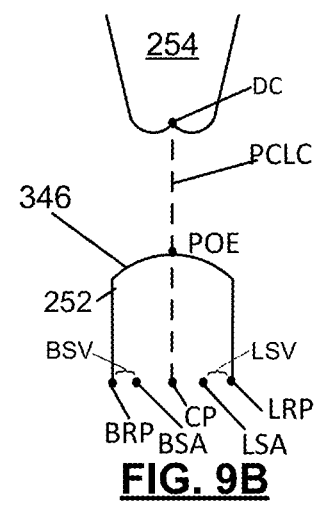
FIG. 9A
FIG. 9B
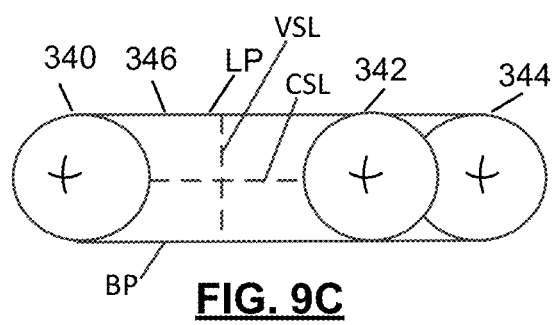
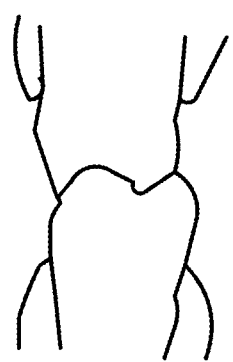
FIG. 9C
FIG. 9D

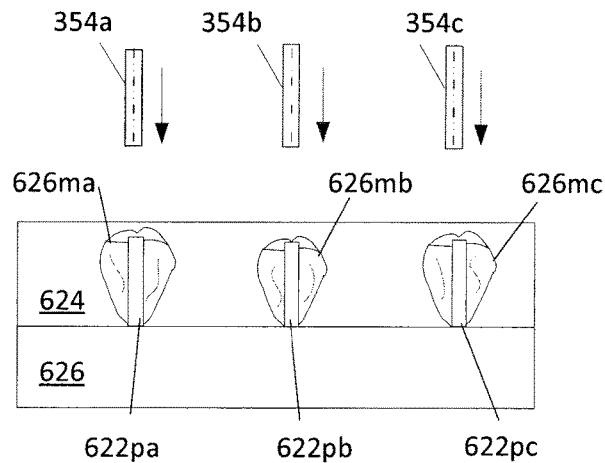
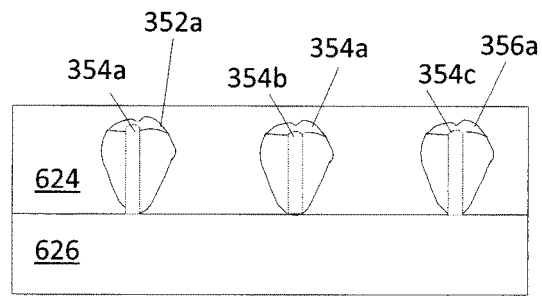
FIG. 19A
FIG. 19B
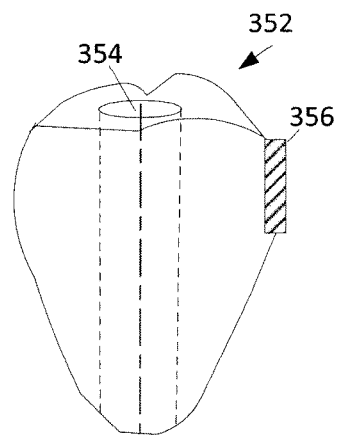
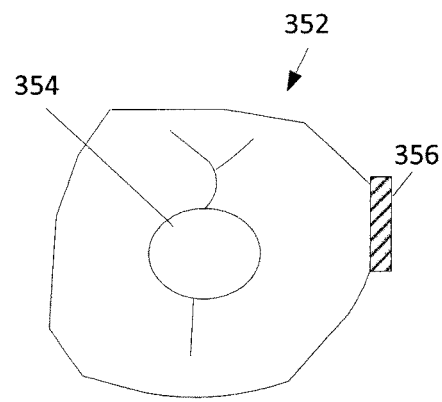
FIG. 19C
FIG. 19D

APPARATUS AND METHOD FOR PERFORMING IMPLANTS

CROSS-REFERENCE TO RELATED APPLICATION

This application claims the benefit of U.S. Provisional Application No. 61/929,465 filed on Jan. 20, 2014. The entire contents of Application No. 61/929,465 are hereby incorporated by reference.

FIELD

The described embodiments relate to apparatus and methods for performing implants for various body parts, and, in one example application, more particularly to apparatuses and methods for performing dental implants.

BACKGROUND

Bone implants is a growing industry that has many different applications including dental implants, knee and joint replacements, and various types of bone anchored prostheses. One of the largest difficulties with inserting an implant, is determining the proper orientation (i.e. angle and depth) for the implant. Inserting the implant at the proper orientation is important since if the implant is improperly placed then it will not be able to successfully withstand the constant forces from opposing structures which will cause the implant to eventually fail and require replacement. Furthermore, if the implant is not properly oriented, then there may be damage to surrounding structures over time.

Dental implant surgery is a prominent field that started back in the 1960's and involves implanting at least one artificial tooth into the maxilla or mandible of a patient who may be a human or an animal. In some cases, dental surgeons perform an unaided visual assessment of the implant area to determine the orientation of the dental implant which in most cases is not accurate. In other more sophisticated cases, some form or medical imaging is used to determine the proper orientation for the alignment; however, this can be costly and cumbersome. In yet other cases, a dental surgeon may insert a dental implant incorrectly and then have to put another angled dental implant onto of the improperly placed dental implant. However, in this situation there are two different axes for the two dental implants and together they are not able to withstand forces during use due to mastication or grinding.

SUMMARY

The following introduction is provided to introduce the reader to the more detailed discussion to follow. The introduction is not intended to limit or define any claimed or as yet unclaimed subject matter. One or more sets of claimed or unclaimed subject matter may reside in a combination or a sub-combination of the elements or process steps as described in any part of this document including its claims and figures.

In one broad aspect, in at least one embodiment described herein, there is provided a dental implant system for use with a patient, wherein the dental implant system comprises: a Deep Tissue Displacement (DTD) quadrant dental tray for making a mould of a portion of an arch of the patient encompassing a dental implant site; a guidance tool for determining a guide bore hole for a dental implant at the dental implant site; and at least one clone tooth for making a dental template for the dental implant site.

In at least some embodiments, the DTD quadrant dental tray may comprise: a support surface having first and second opposed sides with a curvature that corresponds to a quadrant of the patient's arch, the first and second sides being spaced apart to be wider than a portion of jaw bone at the portion of the arch; a first side wall extending away from a first edge of the support surface and having a first contact surface along a first ridge of the first side wall at a first distance away from the support surface; and a second side wall extending away from a second edge of the support surface and having a second contact surface along a second ridge of the second side wall at a second distance away from the support surface, wherein during use the first and second distances are large enough to cause the first and second contact surfaces to displace a portion of at least one of tissue and muscle on either side of the portion of jaw bone to allow the mould to capture deep surface structure of the portion of the jaw bone.

In at least some embodiments, wherein the first and second distances may be similar whereas in other embodiments the first and second distances may be different.

In at least some embodiments, at least one of the first and second side walls are angled at greater than 90 degrees with respect to the support surface.

In at least some embodiments, the first and second side walls may have a width that increases at increasing distances from the support surface.

In at least some embodiments, at least one of the first and second ridges may have a flanged end portion to reduce discomfort to the patient during use.

In at least some embodiments, the dental tray may further comprise a handle portion that is adjacent to the support surface and the first and second side walls.

In at least some embodiments, the support surface may comprise a plurality of apertures for allowing any excess impression material to escape from the dental tray during use.

In at least some embodiments, the guidance tool may comprise: a main body including: a vertical section; and a horizontal section, the horizontal section being adjacent to an upper portion of the vertical section, the horizontal section having a vertical guidance channel disposed near an end opposite the vertical section; and a depth indicator disposed on the main body, the depth indicator being located to indicate a depth of the implant; wherein, during use the depth indicator is located at the implant depth and the guidance tool is positioned at a desired angle where an axis of the vertical guidance channel is aligned with a reference point on an opposing structure and a center point at the implant depth In at least some embodiment, the guidance tool further comprises an angle adjustor coupled to the main body, the angle adjustor being moveable to move the main body closer to or farther away from a side portion of the implant site to vary the angle of the guidance channel during use for determining an orientation for the guide bore hole.

In at least some embodiments, the angle adjustor may be a set screw.

In at least some embodiments, the depth indicator may comprise a length that corresponds to a size of the implant to allow for the guidance tool to be adjusted to determine the desired angle.

In at least some embodiments, the horizontal section may be releasably moveable with respect to an upper portion of the vertical section for adjusting the guidance tool for use with different size implants.

In at least some embodiments, the guidance tool may further comprise a light source housing coupled to the vertical section, a light source disposed within the light source housing, a control input coupled to the light source to activate and deactivate the light source and electrical circuitry to couple the light source with the control input and a power source, wherein during use the light source is configured to shine a light at the implant site to cure light curable binding material at the implant site to hold a model post at the desired angle in order to build an implant template.

In at least some embodiments, the depth indicator may comprise a protrusion that extends from a surface of the vertical section of the main body facing in the same direction as the horizontal section.

In at least some embodiments, the protrusion may comprise a rod.

In at least some embodiments, the guidance tool may further comprise a guide indicator disposed on an exterior surface of the main body to align the guidance channel with a designated point on a structure that opposes the implant site during use.

In at least some embodiments, the guide indicator may be disposed on an exterior surface of the vertical section opposite the horizontal section.

In at least some embodiments, the guide indicator may be disposed on an upper surface of the vertical section.

In at least some embodiments, the guide indicator may comprise a pair of parallel guide lines having a spacing equivalent to a diameter of the guidance channel and disposed to align with opposing sides of the guidance channel.

In at least some embodiments, the guide indicator may comprise a guide line that is aligned with a center of the guidance channel.

In at least some embodiments, the guidance tool may comprise a size parameter that is a distance from a center of the guidance channel to the vertical section that indicates a size of the implant.

In at least some embodiments, the implant may be a dental implant and the size parameter can be one of 4.6, 5 and 5.6 mm.

In at least some embodiments, the clone tooth comprises a main body having a tooth shape; a guide sleeve disposed along a vertical axis of the main body; and an attachment member having an end disposed on an external surface of the main body, the attachment member allowing for attaching the clone tooth with a main body of a dental template during use.

In at least some embodiments, the attachment member may be connected to the guide sleeve.

In at least some embodiments, the attachment member may be attached to the exterior surface of the main body.

In at least some embodiments, the clone tooth may be made from one at least one of acrylic, ceramic, porcelain and metal.

In at least some embodiments, the guide sleeve and the attachment member may be made of at least one of metal and plastic.

In another broad aspect, in at least one embodiment described herein, there is provided a Deep Tissue Displacement (DTD) quadrant dental tray for making a mould of a portion of an arch of a patient. The dental tray comprises a support surface having first and second opposed sides with a curvature that corresponds to a quadrant of the patient's arch, the first and second sides being spaced apart to be wider than a portion of jaw bone at the portion of the arch; a first side wall extending away from a first edge of the support surface and having a first contact surface along a first ridge of the first side wall at a first distance away from the support surface; and a second side wall extending away from a second edge of the support surface and having a second contact surface along a second ridge of the second side wall at a second distance away from the support surface, wherein during use the first and second distances are large enough to cause the first and second contact surfaces to displace a portion of at least one of tissue and muscle on either side of the portion of jaw bone to allow the mould to capture deep surface structure of the portion of the jaw bone.

In at least some embodiments, the DTD quadrant dental tray may be further defined as described above.

In another broad aspect, in at least one embodiment described herein, there is provided a guidance tool for determining a guide bore hole for an implant at an implant site. The guidance tool comprises a main body including a vertical section; and a horizontal section, the horizontal section being adjacent to an upper portion of the vertical section, the horizontal section having a vertical guidance channel disposed near an end opposite the vertical section. The guidance tool further comprises a depth indicator disposed on the main body, the depth indicator being located to indicate a depth of the implant. During use the depth indicator is located at the implant depth and the guidance tool is positioned at a desired angle where an axis of the vertical guidance channel is aligned with a reference point on an opposing structure and a center point at the implant depth.

In some embodiments, the guidance tool may be further defined according as described above.

In another broad aspect, in at least one embodiment described herein, there is provided a clone tooth for use in a dental template. The clone tooth comprise a main body having a tooth shape, a guide sleeve disposed along a vertical axis of the main body; and an attachment member having an end disposed on an external surface of the main body, the attachment member allowing for attaching the clone tooth with a main body of a dental template during use.

In some embodiments, the clone tooth may be defined as described above.

In another broad aspect, in at least one embodiment described herein, there is provided a kit for a dental implant system for use with a patient, the kit comprising a DTD quadrant dental tray for making a mould of a portion of an arch of the patient encompassing a dental implant site, the DTD quadrant dental tray being defined according to any one of the embodiments described herein; a guidance tool for determining a guide bore hole for a dental implant at the implant, the guidance tool being defined according to any one of the embodiments described herein; and at least one clone tooth for making a dental template for the dental implant site, the at least one clone tooth being defined according to any one of the embodiments described herein.

In another broad aspect, in at least one embodiment described herein, there is provided a method for making a working model of a patient's dentition with deep surface structure near a dental implant site. The method comprises obtaining a deep impression mould using a Deep Tissue Displacement (DTD) quadrant dental tray for a portion of an arch of the patient requiring a dental implant, the DTD quadrant dental tray being defined according to any one of the embodiments described herein; obtaining full upper and lower impression moulds of the upper and lower arches of the patient using conventional dental trays; obtaining a bite impression for the patient; obtaining a first model of the arch having the dental implant site by inserting the deep impression mould into a corresponding full impression mould taken of a same area of the patient's dentition, pouring impression material in any void areas and letting the impression material set; obtaining a second model of the other arch by pouring impression material into the other full impression mould and letting the impression material set; mounting the first and second models on an articulator; and adjusting a position of the first and second models using the bite impression to obtain the working model.

In another broad aspect, in at least one embodiment described herein, there is provided a method for determining an orientation for an implant at an implant site using a guidance tool as defined according to any one of the embodiments described herein. The method comprises determining an implant depth point at the implant site based on a depth of the implant; determining first and second horizontal points at the implant depth, the first and second horizontal points being marked on exterior side surfaces that are on either side of the implant site; determining a center point at the implant depth, the center point being located between the first and second horizontal points; positioning the depth indicator of the guidance tool at the implant depth point; determining an angle of the guidance tool with respect to an exterior surface of the implant site by adjusting the guidance tool to align an axis of the guidance channel with a line connecting the center point and a designated point on a structure that opposes the implant during use, wherein the position of the guidance channel determines the orientation for the implant.

In at least some embodiments, the implant is a dental implant and the first and second horizontal points are located on the buccal and lingual plates, respectively, on either side of the implant site.

In at least some embodiments, the horizontal points may be determined from an average tooth diameter for the dental implant and a distance from an adjacent tooth.

In at least some embodiments, the dental implant may be a double-stemmed dental implant, and the method further comprises determining a first apex point at the dental implant depth spaced apart from the first horizontal point by a first value; determining a second apex point at the dental implant depth spaced apart from the second horizontal point by a second value; and determining the center point to be halfway between the first and second apex points.

In at least some embodiments, the first value may be about 3 mm.

In at least some embodiments, the second value may be in the range of about 3 to 5 mm.

In another broad aspect, in at least one embodiment described herein, there is provided an apparatus for making clone teeth, wherein the apparatus comprises a lower platform including at least three guide members arranged in a first pattern, and a plurality of posts arranged in a second pattern with the posts being spaced apart to form the clone teeth thereabout; and an upper platform including at least three guide holes arranged in the first pattern and sized to allow the guide members to pass therethrough during use, a plurality of apertures arranged in the second pattern and being sized to allow the posts to pass therethrough during use; and a mould layer disposed at the upper platform, the mould layer having a plurality of teeth moulds with each tooth mould being centered on one of the plurality of apertures and having a shape corresponding to a tooth.

In at least some embodiments, a plurality of guide sleeves are placed on the plurality of posts after the upper platform has been placed on the lower platform and before the clone teeth are formed.

In at least some embodiments, each guide sleeve further comprises an attachment member that extends from the guide sleeve such that after the clone teeth are formed, the attachment members protrude from an exterior surface of the clone teeth.

In another broad aspect, in at least one embodiment described herein, there is provided a method for making clone teeth using the apparatus as defined above, wherein the method comprises placing the upper platform on the lower platform so that the guide members pass through guide holes and the plurality of posts pass through the plurality of apertures; placing sleeves over the plurality of posts; pouring model material into the plurality of teeth moulds; allowing the model material to harden to form the clone teeth; and removing the clone teeth from the upper platform.

In at least some embodiments, the removing act may comprise removing the upper platform from the lower platform after the model material hardens and removing the clone teeth includes popping the clone teeth from the mould layer.

It will be appreciated by a person skilled in the art that a method or apparatus described herein may embody any one or more of the features contained herein and that the features may be used in any particular combination or sub-combination.

Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment and will now be briefly described.

FIG. 8A is a perspective view of an example embodiment of a guidance tool.

FIG. 8B is a rear view of the guidance tool of FIG. 8A.

FIG. 9A is a partial perspective view of a portion of the working model in an area where the patient requires a dental implant.

FIG. 9B is a cross-sectional view of the working model of FIG. 9A along the Pilot Channel Line Connector (PCLC).

FIG. 9C is a top view of the portion of the working model of FIG. 9A.

FIG. 9D is an example of normal occlusion for two opposing teeth.

FIGS. 19A to 19B are views of the guide sleeves before and after insertion into the clone teeth, respectively, at various stages of the fabrication method of FIG. 17.

FIGS. 19C and 19D are front and top views of a clone tooth fabricated according to the method of FIG. 17.

Figure 1:
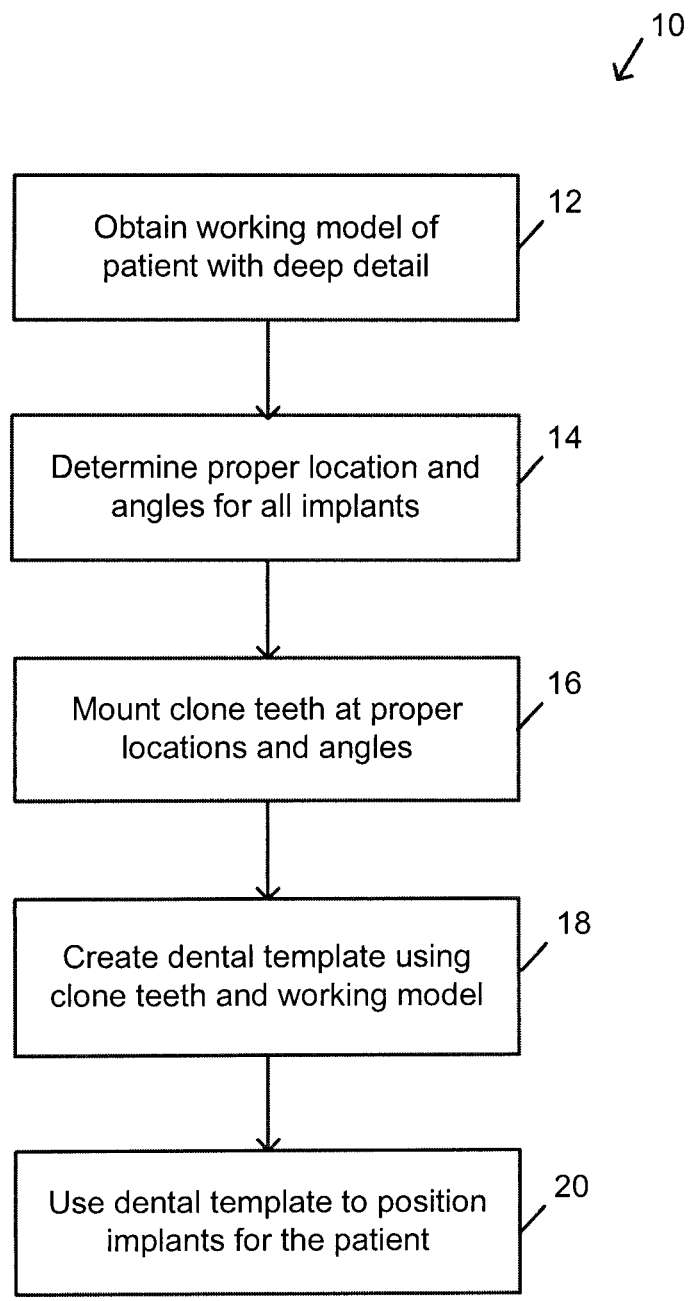
FIG. 1 is a flowchart diagram of an example embodiment of a method for preparing a template for inserting dental implants.

Further aspects and features of the embodiments described herein will appear from the following description taken together with the accompanying drawings.

DESCRIPTION OF EXAMPLE EMBODIMENTS

Various apparatuses or processes will be described below to provide an example of at least one embodiment of the claimed subject matter. No embodiment described below limits any claimed subject matter and any claimed subject matter may cover processes, apparatuses, devices, or systems that differ from those described below. The claimed subject matter is not limited to apparatuses, devices, systems, or processes having all of the features of any one apparatus, device, system, or process described herein or to features common to multiple or all of the apparatuses, devices, systems, or processes described herein. It is possible that an apparatus, device, system, or process described herein is not an embodiment of any claimed subject matter. Any subject matter that is disclosed in an apparatus, device, system, or process described below that is not claimed in this document may be the subject matter of another protective instrument, for example, a continuing patent application, and the applicants, inventors, or owners do not intend to abandon, disclaim, or dedicate to the public any such subject matter by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

It should be noted that terms of degree such as "substantially", "about" and "approximately" as used herein mean a reasonable amount of deviation of the modified term such that the end result is not significantly changed. These terms of degree should be construed as including a deviation of the modified term if this deviation would not negate the meaning of the term it modifies.

Furthermore, the recitation of any numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation up to a certain amount of the number to which reference is being made if the end result is not significantly changed.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

The various embodiments described herein generally relate to apparatus and methods for performing bone implants such as, but not limited to, dental implants, knee and joint replacements, and various types of bone anchored prosthesis, for example. For a better understanding of how the various apparatus and methods can be used for bone implants, an example will be given herein with respect to dental implants.

With respect to dental implants, the various apparatuses and methods described herein may be used to improve a surgeon's ability to consistently and properly place a dental implant so that it is ideally situated in the substratum and is positioned to meet the opposing structure, such as an opposing tooth for example, so that the dental implant can sustain forces down its long axis during use. In this regard, there are three tools that may be used at various stages of the process. The tools include a Deep Tissue Displacement (DTD) quadrant dental tray, a guidance tool (which may also be referred to as a navigator), and a dental template made using clone teeth that can be used to guide a surgical dental procedure to install a dental implant. These three tools are somewhat related to one another as the DTD quadrant dental tray and the guidance tool each perform a function that will improve the accuracy and effectiveness of the dental template which will allow a dental surgeon to more easily and accurately insert one or more dentals into a patient's mouth. Accordingly, in some embodiments, a dental implant system may comprise the DTD quadrant dental tray, the guidance tool and the clone teeth to make the dental template.

Reference is now made to FIG. 1, which illustrates a flowchart diagram of an example embodiment of an implant method 10 for preparing a template that is then used to insert at least one dental implant into a patient's mouth. For example, a patient goes to their dentist's office and if it is determined that a patient requires one or more dental implants, then method 10 may be used to insert the dental implant(s).

Figure 2:
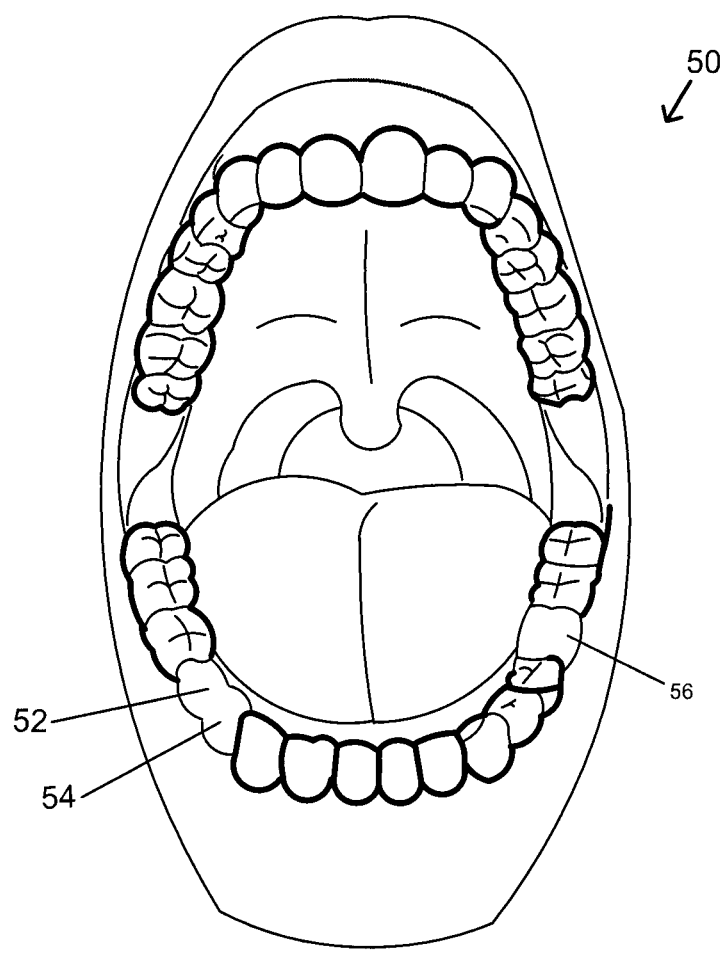
FIG. 2 is a figure of an example of a patient's mouth that requires dental implants.

For illustrative purposes, FIG. 2 shows an example of the mouth 50 of a patient who requires dental implants. In this case the patient is human, but it should be understood that method 10 may be performed on animals requiring dental implants. In this example, the patient requires two dental implants at implant sites 52 and 54 in the lower right quadrant of the patient's mouth 50 and another dental implant at implant site 56 in the lower left quadrant of the patient's mouth 50. The method 10 may generally be performed for inserting a dental implant along any portion of the patient's lower arch or the anterior portion of the patient's upper arch (where the sinus is not involved) as long as a suitable dental template may be fabricated.

At 10, a working model of the patient's dentition is obtained in which there is deep detail (e.g. detail of the deep structure) at the implant sites and the surrounding portions of the patient's gums and jaw bone. The working model with deep detail is used since various features of the deep structure near the implant sites are used to determine the proper orientation of the dental implant.

Figure 3:
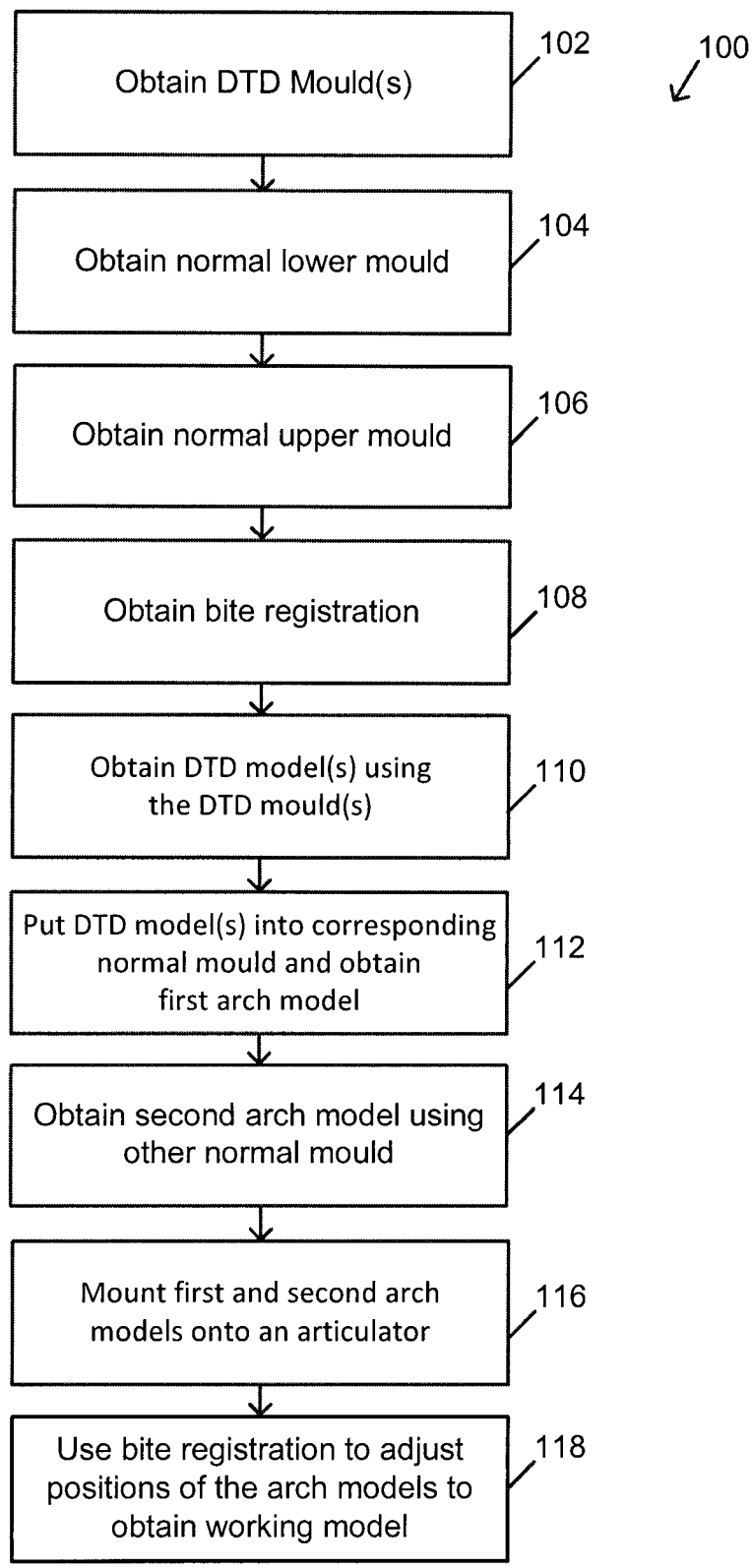
FIG. 3 is a flowchart diagram of an example embodiment of a method for obtaining a working model of the patient's mouth showing deep structure.

Referring now to FIG. 3, shown therein is a flowchart diagram of an example embodiment of a deep impression method 100 for obtaining a working model of the patient's mouth showing deep structure.

At 102, deep (or DTD) moulds are obtained for a quadrant of the patient's mount requiring at least one dental implant. In general, one may obtain a DTD mould for a patient's lower left quadrant, lower right quadrant, both the lower left and right quadrants, or a portion of the anterior teeth of the upper arch. Based on the example shown in FIG. 2, DTD moulds of the lower right and lower left quadrants are needed.

In general, for each quadrant requiring a DTD mould, a DTD quadrant dental tray for that particular quadrant with impression material is inserted onto the corresponding quadrant of the patient's dentition to create a negative mould of the deep structure for that particular quadrant. Any suitable impression material may be used. In general, the DTD quadrant dental tray has contact edges with a sufficient height (and the DTD quadrant dental tray has sufficient depth) so that the contact edges will push down on at least one of the tissue and the muscle that is at the floor of the patient's mouth and at the buccal sulcus of the patient so that a deep impression of the bone structure that surrounds the area(s) requiring the dental implant can be obtained. The DTD quadrant dental tray is configured to preferably expose as much of the jaw bone as possible without causing discomfort or injury to the patient. The resulting deep impression mould captures the implant site and permits the fabrication of a working model which clearly defines the parameters of the substructure of the patient's mouth that will support the dental implant.

At this point, a DTD quadrant dental tray is used rather than a full arch dental tray due to the divergent nature of the mandible (i.e. the mandible gets thicker as one moves deeper along the mandible away from the crestal surface of the jaw). The DTD quadrant dental tray is also used due to the inability of the periphery of a normal conventional tray to control and manipulate the soft tissues adjacent to the bone of the patient's jaw. In fact, conventional dental trays have not been designed to move tissue or muscle in the mouth. Therefore, one can only take an impression one quadrant at a time using a DTD quadrant dental tray according to the teachings herein in order to get the deep impression for a particular quadrant. This is extremely hard to accomplish using a conventional full arch dental tray or a conventional quadrant dental tray.

Figure 4B:
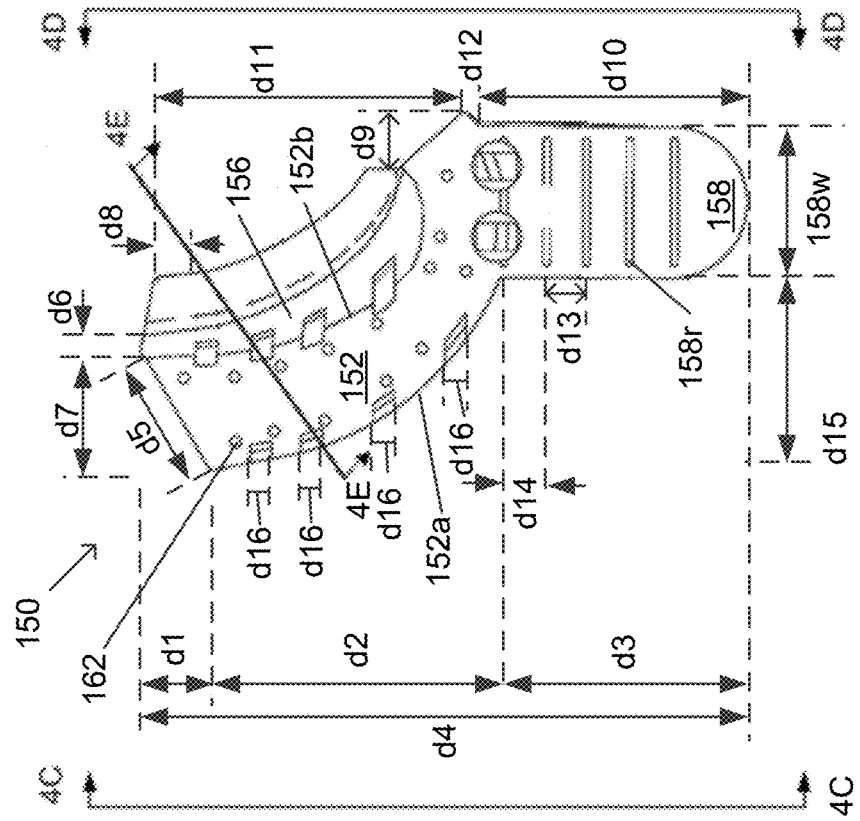
FIGS. 4A to 4E are bottom, top, left side, right side, and front views, respectively, of an example embodiment of a Deep Tissue Displacement (DTD) quadrant dental tray.
Figure 4A:
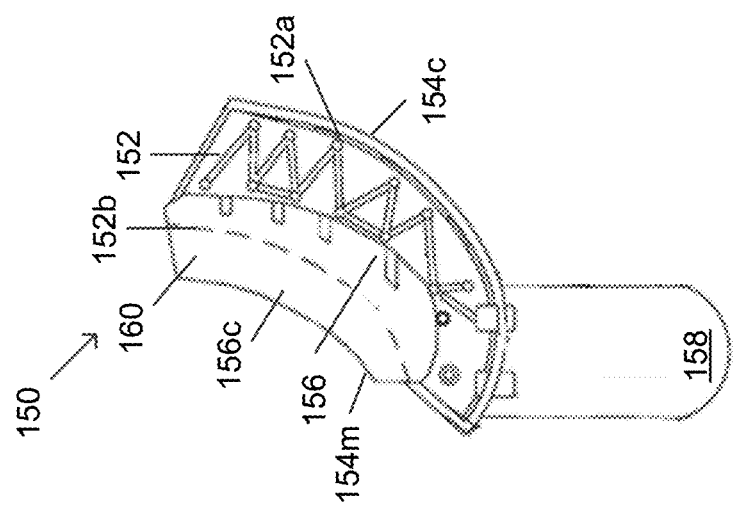
Figure 4C:
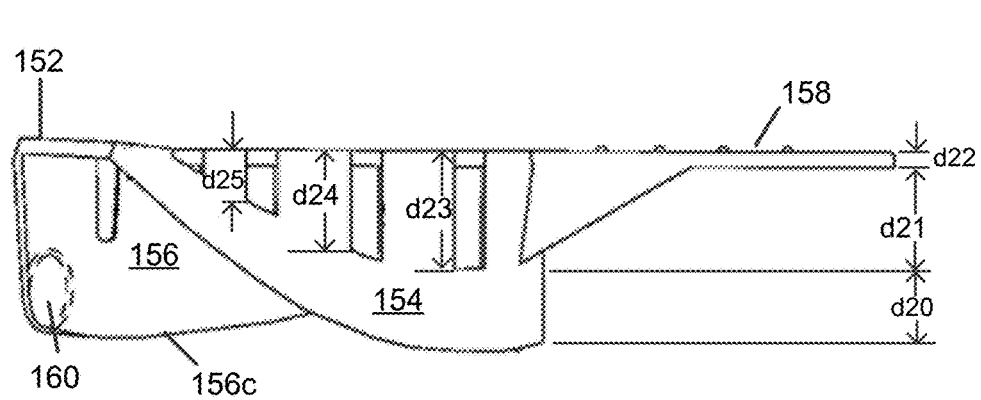
Figure 4D:
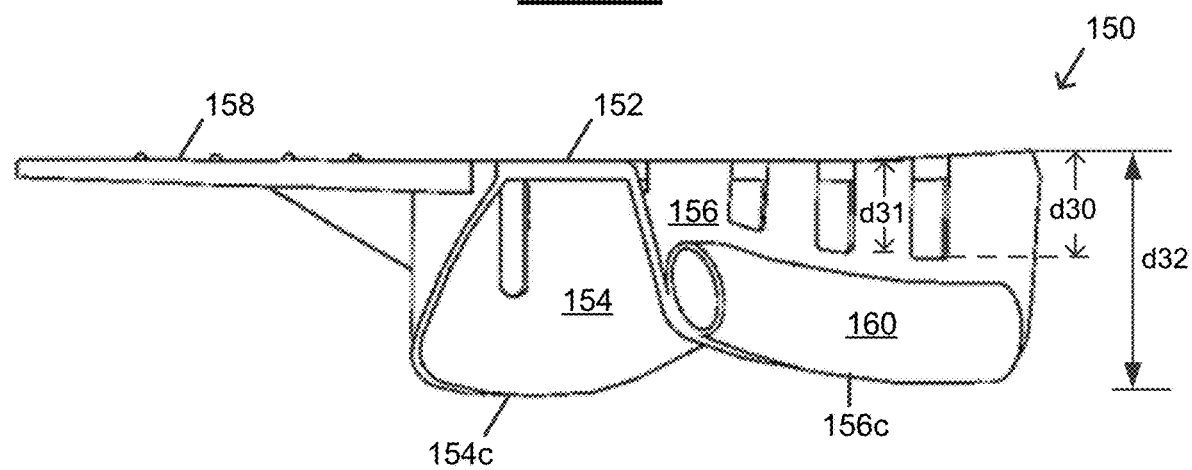
Figure 4E:
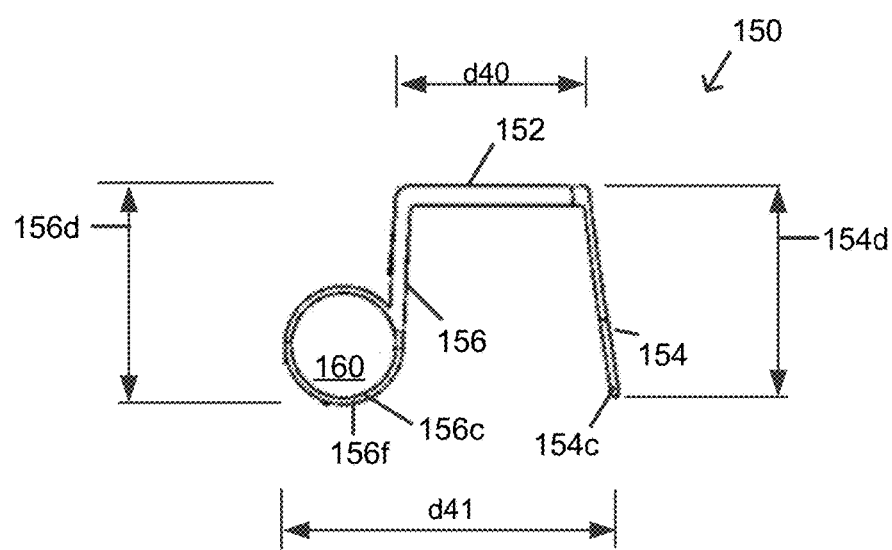

Referring now to FIGS. 4A to 4E, shown therein are various views of an example embodiment of a DTD quadrant dental tray 150. FIGS. 4A and 4B are bottom and top views, respectively, of the DTD quadrant dental tray 150. FIGS. 4C and 4D are opposing side views of the DTD quadrant dental tray 150. FIG. 4E is a cross-sectional view of the DTD quadrant dental tray 150 along the line 4E shown in FIG. 4A.

The DTD quadrant dental tray 150 comprises a support surface 152, two side walls 154 and 156 and a handle portion 158. The support surface 152 has first and second opposed edges 152a and 152b with a curvature that corresponds to a quadrant of the patient's arch. The first and second edges 152a and 152b are spaced apart so that they are wider than a portion of the jaw bone at the patient's arch. The handle portion 158 allows for the insertion and removal of the DTD quadrant dental tray 150 from the patient's mouth by a user, such as a dentist or dental hygienist, for example. The DTD quadrant dental tray 150 also comprises wide generally vertical ribs along the side walls 154 and 156 to provide additional strength.

The first side wall 154 extends away from the first edge 152a of the support surface 152. The first side wall 154 has a first contact surface 154c along a ridge of the first side wall 154 at a first distance 154d away from the support surface 152.

The second side wall 156 extends away from the second edge 154b of the support surface 152. The second side wall 156 has a second contact surface 156c along a ridge of the second side wall 156 at a second distance 156d away from the support surface 152.

The first and second distances 154d and 156d are large enough so that during use the first and second contact surfaces 154c and 156c displace a portion of at least one of the tissue and muscle on either side of the portions of the patient's jaw bone surrounding the one or more dental implant sites so that a mould may be created that captures the deep surface structure on opposing surfaces of the portion of the patient's jaw bone near the dental implant site(s).

In some embodiments, the first and second distances 154d and 156 are substantially similar or equal. In other embodiments, the first and second distances 154d and 156 are different. In general, the first and second distances may be about 25 mm, 26 mm, 27 mm or about 30 mm or another sufficient amount so that the patient's tissue and/or muscle on either side (i.e. buccal and lingual) of the portion of the patient's jaw bone where the mould is being made is displaced away from the jaw bone during use. In general, the height is related to the depth at which structural detail is desired and this may differ depending on the type of dental implant that will be used and the size of this region of the patient's jaw bone and surrounding tissue and muscle. In the example shown further below, detail at a depth of about 13 mm is desired. It should be noted that the depth is measured down from the crestal ridge of the implant site.

For the DTD quadrant dental tray 150, it can be seen that the second side wall 156 is at about a 90 degree angle with respect to the support surface 152 while the first side wall 154 is angled at an angle greater than 90 degrees with respect to the support surface 152. In other embodiments, the first side wall 154 may also be at an angle of greater than 90 degrees with respect to the support surface 152. In other embodiments, both the first and second side walls 154 and 156 may be at an angle of about 90 degrees with respect to the support surface.

Furthermore, in at least some embodiments, the contact surfaces 154c and 156c of the first and second side walls 154 and 156 respectively may have a lip or a flanged 160 with an end portion 156f so as to provide a "cushion effect" and reduce discomfort to the patient during use. In other embodiments, the contact surfaces 154c and 156c may be very blunt, tube-like, furled or padded. It can also be seen that the first and second side walls 154 and 156 are tapered at a first end of the support surface 152 that is opposite from the second end of the support surface 152 that is adjacent to the handle portion 158. In other words, the tapered portion of the first and second side walls 154 and 156 is disposed near the portion of the DTD quadrant dental tray 150 that is used to make an impression mould of the most posterior teeth.

It should also be noted that in some embodiments, such as for the DTD quadrant dental tray 150 shown in FIGS. 4A to 4E, there can be a plurality of apertures 162 (only one of which is labelled for ease of illustration) that allow any excess impression material to exit from the DTD quadrant dental tray 150 during use. This allows for a better deep tissue impression mould to be made.

In FIG. 4A, the contact surface 154c has a width of 1/16 inches and the member 154m has a width of 1/16 inches. In FIG. 4B, the width 158w of handle 158 is 15/16 inches which narrows to a width of 7/8 inch at the end of the handle 158, and the length of the handle 158 is 1 and 7/16 inches. Furthermore, the distance between adjacent full ridges 158r on the handle 158 is 1/4 inches, the distance from the end of the handle 158 to the closest ridge 158r is 7/16 inches. The holes 162 have a diameter of 1/16 inches. The perforations 156p have a width of 1/8 inches. Still referring to FIG. 4B, the distance d1 is 13/32 inches. The distance d2 is 1 and 11/16 inches. The distance d3 is 1 and 7/16 inches. The distance d4 is 3 and 17/32 inches. The distance d5 is 3/4 inches. The distance d6 is 7/32 inches. The distance d7 is 21/32 inches. The distance d8 is 5/16 inches. The distance d9 is 15/32 inches. The distance d10 is 1 and 9/16 inches. The distance d11 is 1 and 13/16 inches. The distance d12 is 3/32 inches. The distance d13 is 7/32 inches. The distance d14 is 1/4 inches. The distance d15 is 1 and 1/8 inches. The distance d16 is 1/16 inches. The distance between each d16 may vary between 5/32 inches to 9/32 inches. Referring now to FIG. 4C, the distance d20 is 5/16 inches. The distance d21 is 13/32 inches. The distance d22 is 1/16 inches. The distance d23 is 15/32 inches. The distance d24 is 13/32 inches. The distance d25 is 7/32 inches. Referring now to FIG. 4D, the distance d30 is 3/8 inches. The distance d31 is 5/16 inches. The distance d32 is 27/32 inches. Referring now to FIG. 4E, the distance d40 is 19/32 inches. The distance d41 is 1 and 1/16 inches.

Figure 5A:
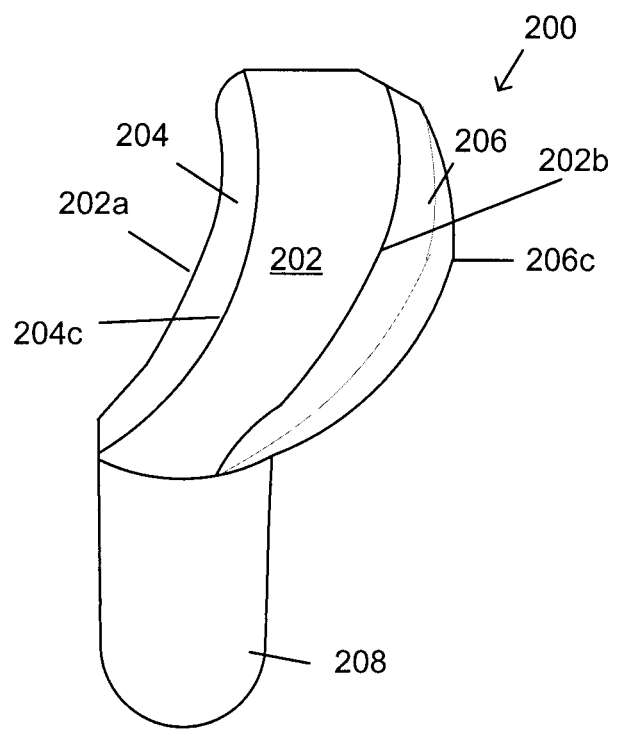
FIGS. 5A to 5E are bottom, top, first perspective, second perspective, and side views, respectively, of another example embodiment of DTD quadrant dental tray.
Figure 5B:
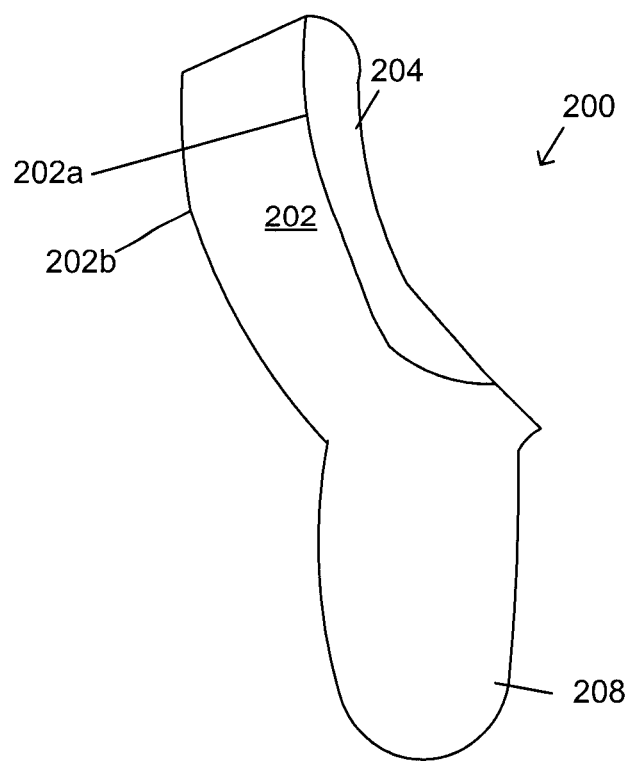
Figure 5C:
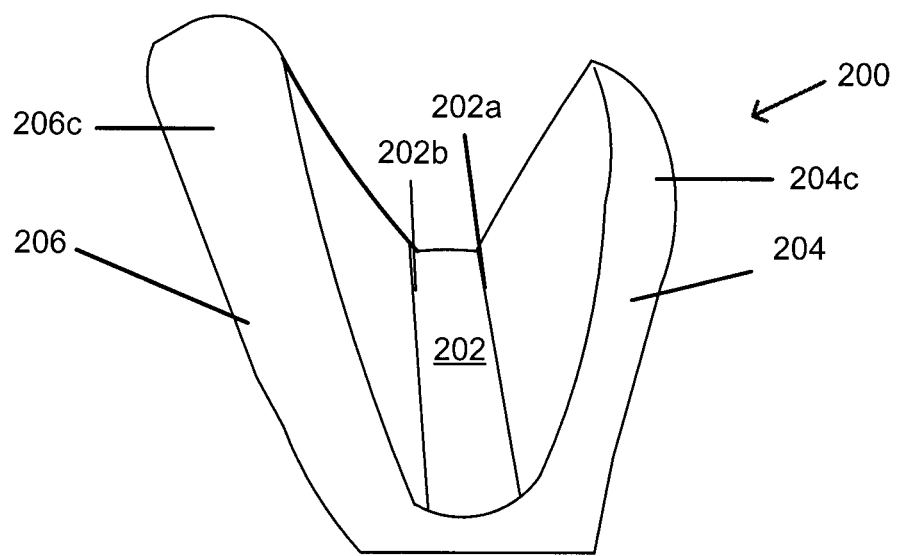
Figure 5D:
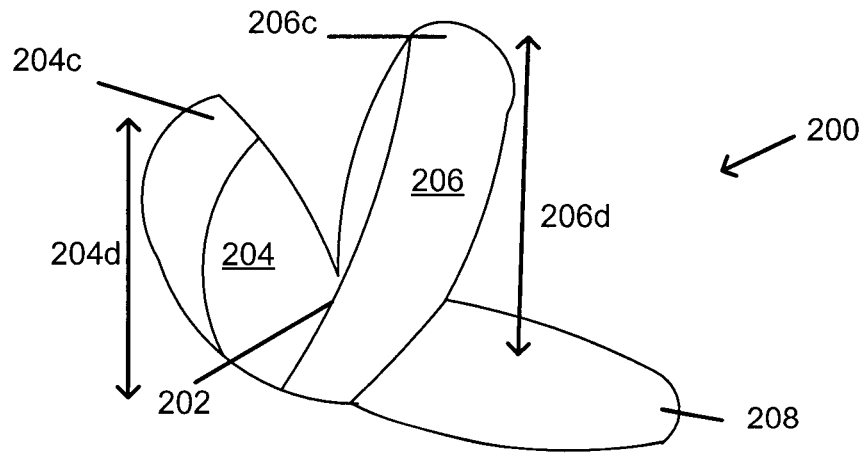
Figure 5E:
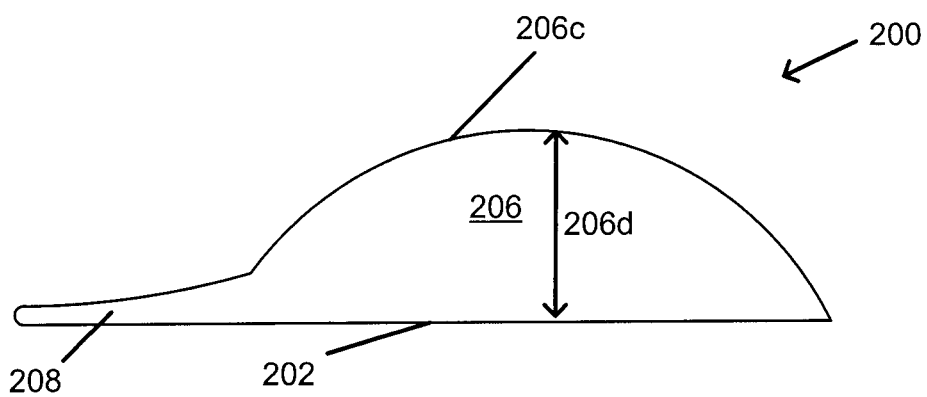

Referring now to FIGS. 5A-5E, shown therein are various views of another example embodiment of a DTD quadrant dental tray 200. FIGS. 5A and 5B are top and bottom views, respectively, of the DTD quadrant dental tray 200. FIGS. 5C and 5D are opposing perspective end views of the DTD quadrant dental tray 200. FIG. 5E is a side view of the DTD quadrant dental tray 200.

The DTD quadrant dental tray 200 comprises a similar structure and functions in a similar way as the DTD quadrant dental tray 150. The DTD quadrant dental 200 comprises a support surface 202, two side walls 204 and 206 and a handle portion 208. The support surface 202 has first and second opposed edges 202a and 202b.

The first side wall 204 extends away from the first edge 202a of the support surface 202 at a first angle. The first side wall 204 has a first contact surface 204c along a ridge of the first side wall 24 at a first distance 204d away from the support surface 202.

The second side wall 206 extends away from the second edge 204b of the support surface 202 at a second angle. The second side wall 206 has a second contact surface 206c along a ridge of the second side wall 206 at a second distance 206d away from the support surface 202.

The first and second distances 204d and 206d are large enough so that during use the first and second contact surfaces 204c and 206c displace a portion of at least one of tissue and muscle on either side of the portion of the patient's jaw bone that surrounds the dental implant site(s) to allow the mould to capture deep surface structure on opposing surfaces of the portion of the jaw bone near the dental implant site(s).

The first and second side walls 204 and 206 of the DTD quadrant dental tray 200 are also tapered near an end portion of the support surface 200 opposite the handle portion 208. However, the first and second side walls 204 and 206 have a width that increases at increasing distances from the support surface 200.

It should be noted that for both the DTD quadrant dental tray 150 and the DTD quadrant dental tray 200, there can be several of these trays having different widths or sizes to accommodate patients with varying sizes of teeth and jaw bones. For example, these dental trays can be made to have 3 or 4 different widths and 2 or 3 different heights to accommodate patients with varying sizes of teeth and jaw bone.

Referring once more to FIG. 3, once the DTD mould(s) have been obtained at 102, normal lower and upper moulds are obtained at 104 and 106 using conventional full arch dental trays. In particular, at 104 a conventional dental tray filled with impression material is inserted into the patient's mouth to get a regular negative mould of the patient's lower arch and at 106 a conventional dental tray filled with impression material tray is inserted into the patient's mouth to get a regular negative mould of the patient's upper arch.

At 108, the patient bites into an impression material to provide a registration bite. The registration bite is later used to adjust the position of the upper and lower moulds relative to one another to obtain a working model of the patient's dentition.

At 110, model material is poured into the DTD mould(s) and allowed to set to provide DTD models. Any suitable material may be used as is known to those skilled in the art. For instance, the DTD models may be obtained using casting resin.

Figure 6A:
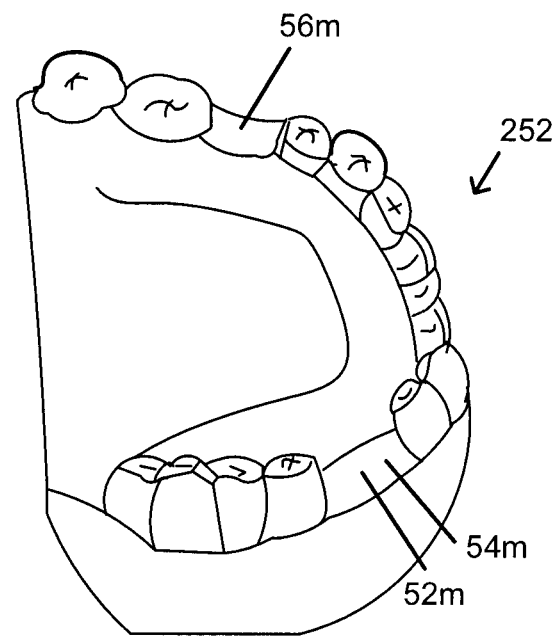
FIG. 6A is a perspective view of the lower arch of the working model of the mouth of FIG. 2 that is obtained using DTD quadrant trays.

At 112, each DTD model is placed into a corresponding position in the normal mould that corresponds to the implant sites of which the DTD model(s) were made. Using the example of FIG. 2, a lower right quadrant DTD model and a lower left quadrant DTD model are made. The DTD models are then placed in the corresponding positions in the normal lower mould taken of a same area of the patient's dentition. If there is not an accurate fit between a DTD mould and a normal mould then there is likely too much detail on the DTD models and excess material may have to be cut or shaved away to get the DTD models to get a better fit with a normal mould. The model material is then poured into any vacant areas to create a model of the lower arch of the patient having deep structural detail of the implant site(s). The amount of model material that may be poured is such that there is enough contact and overlap with the DTD models to form a strong final lower arch model. The result is a complete full arch reproduction that includes deep structural detail of the implant site(s). An example of a lower arch model 252 is shown in FIG. 6A which also has dental implant sites 52m, 54m and 56m that correspond to the sites 52, 54 and 56 of the example patient mouth (see FIG. 2) requiring dental implants.

At 114, another normal model is obtained by pouring model material into the normal mould that does not correspond to the patient's jaw requiring implants. Once the model material is allowed to harden, it is removed to obtain the other arch model. In the example of FIG. 2, this is the upper arch model.

Figure 6B:
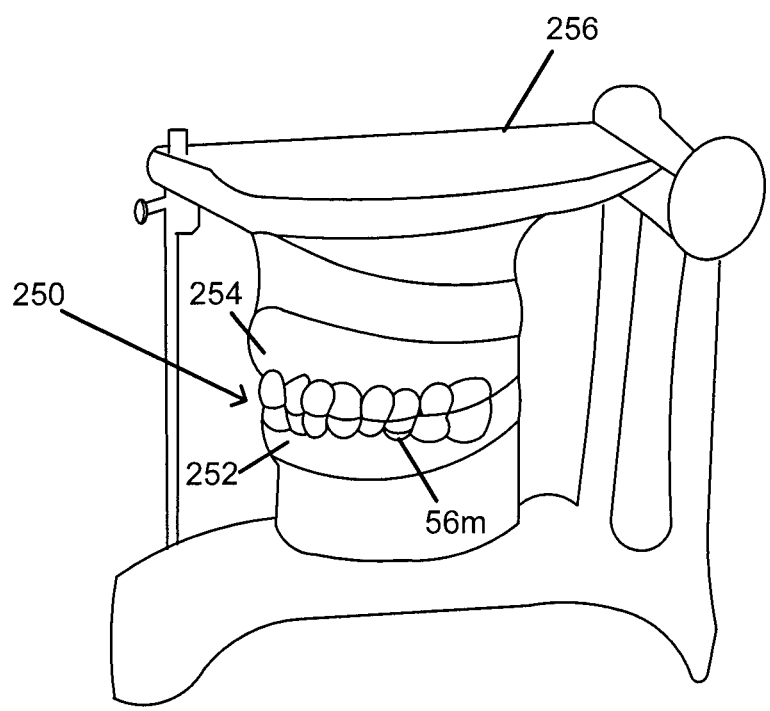
FIG. 6B is a view of the upper and lower models mounted on an articulator to form a working model.

At 116, the lower arch model 252 and the upper arch model 254 are mounted onto an articulator 256, an example of which is shown in FIG. 6B. At 118, the bite registration obtained at 108 is used to adjust the position of the upper and lower arch models 252 and 254 to obtain a working model 250 which is a replica of the patient's entire dentition. The full lower arch model 252 and the opposing upper arch model 254 are now mounted in centric occlusion on the articulator 256. The working model 250 is unique in that it provides an exact replica of the implant site(s). A dentist and a lab technician that use the working model 250 now have all of the dimensions and relationships that may be used to select the ideal dental implant and to fabricate a master surgical dental template which will guide the surgical dental implant procedure.

Referring once again to FIG. 1, at 14 of the implant method 10 the proper position and angle, collectively referred to as proper orientation, for each of the dental implants is determined.

In general, a method for determining an orientation for an implant at an implant site comprises using a guidance tool having a guidance channel, an example of which is discussed in relation to FIGS. 8A to 9C, determining an implant depth point based on a depth of the implant, determining first and second horizontal points at the implant depth, the first and second horizontal points being marked on exterior surfaces that are on opposite sides of the implant site, determining a center point at the implant depth, the center point being located between the first and second horizontal points, positioning the depth indicator of the guidance tool at the implant depth point, and determining an angle of the guidance tool with respect to an exterior surface of the implant site by adjusting an angle adjustor of the guidance tool to align the axis of the guidance channel with a line connecting the center point and a designated point on a structure that opposes the implant during use, wherein the orientation of the guidance channel determines the orientation for the implant.

Figure 7:
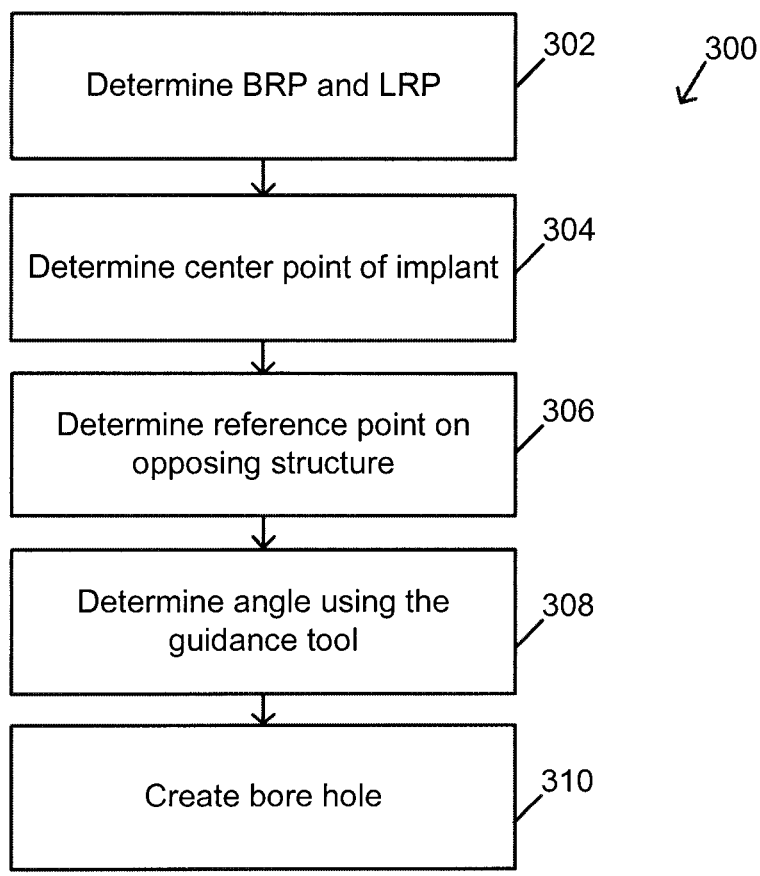
FIG. 7 is an example embodiment of a method for obtaining the position and angle for a bore hole for a dental implant.

Continuing with the dental example, a flowchart of an example embodiment of an orientation method 300 for determining the orientation for a dental implant is shown in FIG. 7. In the orientation method 300, dead reckoning may be used which means determining a course of action by using known positions. A guidance tool is also used with the orientation method 300 on the working model 250 along with dead reckoning to determine the proper orientation for the dental implant on the working model 250. The proper orientation may then be used to make a dental template for use during the actual insertion of the dental implant into the patient's mouth. The orientation method 300 can be used on a lower arch model or in the anterior portion of an upper arch model.

The proper orientation may be determined so that the path of insertion for the stem(s) of the dental implant (depending on the type of dental implant) is approximately equidistant from the cortical bone on either side of the core of the dental implant. The core of the dental implant is the portion of the dental implant that is not in the bone but supports the crown portion of the dental implant. The core of the dental implant will then support the final restoration and have an axis that is directed along the point of occlusion using the apparatus and methods described herein.

At 302 of the orientation method 300, and referring to FIGS. 9A to 9D, a Buccal Reference Point (BRP) and a Lingual Reference Point (LRP) are determined at an implant depth point that corresponds to the depth of the bottom of the dental implant with respect to the crestal ridge at the implant site. The horizontal position of the BRP and the LRP is determined from the location of an adjacent tooth as follows. FIG. 9A shows a single dental implant site which may be analogous to site 56 from FIG. 2, for example. An Adjacent Tooth Diameter (ATD) is determined from an adjacent tooth, which can be an anterior tooth 340 for dental implants that are closer to the front of the patient's mouth or the posterior tooth 342 for dental implants that are closer to the back of the patient's mouth. Alternatively, the ATD may be determined from the adjacent tooth to the dental implant site that is more visible when one looks at the patient's mouth. The ATD for the implant site is then used to select the size for the dental implant for that implant site. For example, the size of the dental implant may be the same as the ATD, slightly larger than the ATD or slightly smaller than the ATD. Given the situation of FIG. 2, then the ATD for tooth 340 may be chosen for the ATD of the dental implant. The horizontal position of the BRP and the LRP can then be determined by adding an inter-tooth spacing value to half of the ATD for the dental implant measured from the adjacent tooth from which the initially ATD value was determined. In this case, the horizontal position of the BRP and the LRP is determined from tooth 340. The inter-tooth spacing value is generally chosen according to a rule of thumb which generally involves using a value of 2 mm, although it may be possible to use other values in other circumstances.

Once the BRP and the LRP are determined and marked on the working model 250 (in this example the lower working model 252), a Vertical Survey Line (VSL) can then be drawn on the lower working model 252 up from the BRP on the buccal side of the lower working model 252 over the crestal ridge 346 and down to the LRP on the lingual side of the lower working model 252. At this point a Crestal Survey Line (CSL) running along the crestal ridge and bisecting the top of the teeth 340 and 342 on either side of the dental implant may be drawn on the crestal ridge of the lower working model 252 in an anterior/poster direction.

At 304 a Center Point (CP) at the implant depth for the bore hole of the dental implant is determined. The CP is located between a Buccal Stem Apex (BSA) and a Lingual Stem Apex (LSA). The BSA is determined at the same depth as the BRP but is located in the jaw and spaced from the BRP by a Buccal Space Value (BSV) depending on the type of dental implant. In a likewise fashion, the LSA is determined at the same depth as the LRP but is located in the jaw and spaced from the LRP by a Lingual Space Value (LSV). The BSA and the LSA are located on a line that connects the BRP and the LRP. The CP may then be determined as being the midpoint between the BSA and the LSA on the line connecting the BRP and the LRP. The CP is where the bore hole for the dental implant will be located. While the example is being described for a dental implant with two stems, a similar procedure may be used for a dental implant with one stem in which BSV and the LSV may be measured to the CP and be approximately the same.

As an example, a dental implant may be used that has two stems with a length of about 13 mm. Therefore, the implant depth will be 13 mm from the crestal ridge. The implant depth may also be selected such that the margin of the core of the dental implant is not visible but is hidden by the surrounding gum which is about 2 mm of the sulcus. The BSA may be selected as being 3 mm from the BRP. The LSA may be chosen as being anywhere between 3 mm to 5 mm from the LRP. The type of dental implant (i.e. number of stems) and the width of the dental implant will affect the location of the BSA and LSA. For example, depending on the width of the dental implant, the BSA and LSA may be chosen so that the dental implant is centered between the buccal and lingual plates at the implant site although other placements may be used if deemed to be more suitable.

After the CP has been determined, the orientation method 300 proceeds to 306 where a reference point on an opposing structure is located. The reference point will be the area where the opposing structure will transfer force to the implant during use. For this reason, the bore hole of the implant should have a central axis that is aligned with the reference point so that the force is directed along the central axis of the implant during use so that the implant is better able to withstand this force, have a longer lifetime and reduce any discomfort to the patient. This concept may be extended to many different types of implants for various body parts including implants used for hip or knee restoration.

In cases where the implant is a dental implant, the reference point on the opposing structure will generally be the Designated Cusp (DC) on the opposing tooth for the dental implant. In the example, the DC is on tooth 348 which will oppose the dental implant after it has been installed. When the dental implant is properly aligned the result will be the proper occlusion with the DC, as is shown for two teeth in FIG. 9C.

In situations in which there is no opposing tooth, the CP can be lined up with a point on the opposing crestal ridge.

Now that the CP and the DC have been determined, the orientation method 300 proceeds to 308 where a guidance tool is used to determine the proper orientation for the dental implant by determining the orientation of the line from the DC to the CP which is referred to as the Pilot Channel Line Connector (PCLC). The spot on the crestal ridge where the PCLC penetrates the crestal ridge is referred to as a Point of Entry (POE) as is shown in FIG. 9A. The PCLC is used as the dental implant will be 1 straight piece rather than two separate implant pieces that may be mounted at different angles to correct incorrectly positioned implant stems as may occur due to using conventional positioning techniques.

An example embodiment of a guidance tool 320 that may be used with the orientation method 300 for determining a guide bore hole for an implant at an implant site is shown in FIGS. 8A and 8B. The guidance tool 320 generally comprises a main body 322, a depth indicator 330 and an angle adjustor 332.

The main body 322 includes a vertical section 324 and a horizontal section 326. The horizontal section 326 is adjacent to an upper portion of the vertical section 324 and has a vertical guidance channel 328 disposed near an end of the horizontal section 326 that is opposite the vertical section 324. In use, the guidance channel 328 may be used to direct a model drill (in a later step) on a path that runs parallel to the vertical section 324 of the main body 322 for creating a bore hole for a dental implant.

The depth indicator 330 is disposed on the main body 322 on the same side as the horizontal section 326 and is located to indicate a depth for the guide bore hole. In some embodiments, the depth indicator 330 may be a protrusion that extends from a surface of the vertical section 324 of the main body 322 facing in the same direction as the horizontal section 326. In some embodiments, the depth indicator 330 may be a rod which extends at a right angle to the vertical section 324 of the main body 322 as is the case shown for the example embodiment shown in FIGS. 8A to 8B. The rod may have a length of 4 mm and a diameter of 1.5 mm, for example. In some embodiments, the location of the depth indicator 330 may be adjustable or there may be more than one depth indicator 330 to allow the guidance tool 320 to be used with different implants that are installed at different depths.

The angle adjustor 332 is coupled to the vertical section 324 of the main body 322 between the vertical section 326 and the depth indicator 330. The angle adjustor 332 is moveable to move the main body 322 of the guidance tool 320 closer or farther away from a side portion of the implant site to vary an angle of the guidance channel 328 during use for determining the angle for the guide bore hole. The angle adjustor 332 may be about 8 mm above the depth indicator 330, for example.

Figure 10B:
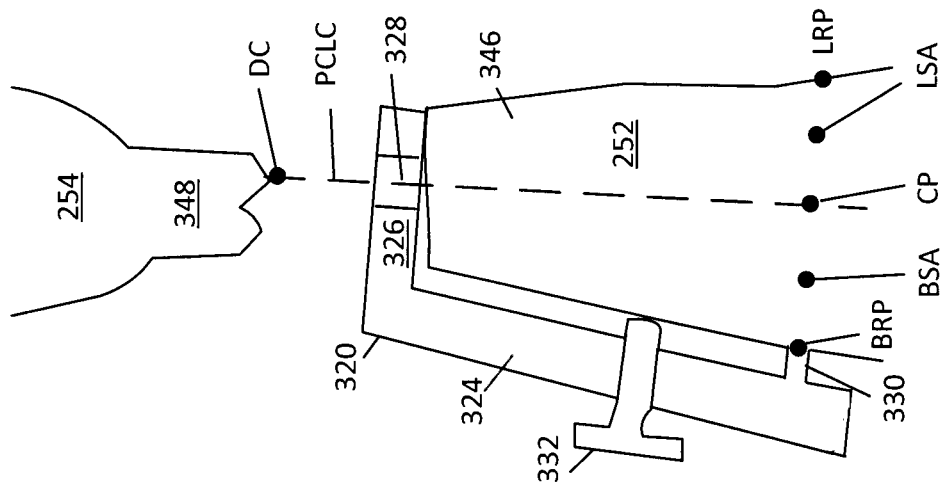
FIG. 10B is a cross-sectional view of the working model of FIG. 9A with the guidance tool during use.
Figure 10A:
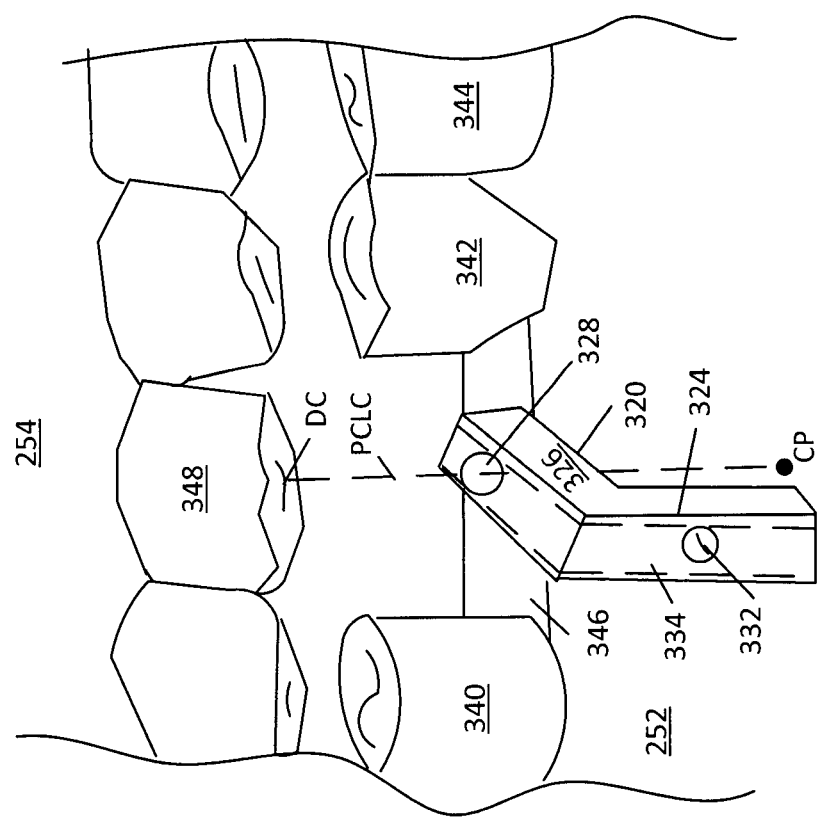
FIG. 10A is a partial perspective view of the working model of FIG. 9A with the guidance tool during use.

In some embodiments, the angle adjustor 332 may be a set screw as is the case for the example embodiment shown in FIGS. 8A and 8B. As the set screw is screwed inwards, the upper portion of the vertical section 324 of the guidance tool 320 moves away from an adjacent vertical surface of the implant site. As the set screw is screwed outwards, the upper portion of the vertical section 324 of the guidance tool 320 moves towards the adjacent vertical surface of the implant site. Accordingly, for dental implants, the angle adjustor 332 controls the angle θ of the guidance tool 320 in the buccal-lingual plane, an example of which is shown in FIGS. 10A and 10B.

The guidance tool 300 may further comprise a guide indicator 334 disposed on an exterior surface of the main body 322 which can be used to align the guidance channel 328 with the designated point on the structure that opposes the implant site and provides a force to the implant site during use.

In some embodiments the guide indicator 334 may be disposed on an exterior surface of the vertical section 324 that is opposite the surface of the vertical section 324 adjacent the horizontal section 326 as is shown in FIGS. 8A and 8B. In some embodiments the guide indicator 334 may also be disposed on the upper surface of the vertical section 326 as is shown in FIGS. 8A and 8B.

In some embodiments, the guide indicator 334 comprises a pair of parallel guide lines having a spacing equivalent to a diameter of the guidance channel 328 and is disposed to align with opposing sides of the guidance channel 328 and be parallel to the edges of the horizontal section 326.

In some embodiments, the guide indicator 334 comprises a guide line that is aligned with a center of the guidance channel 328. In some embodiments, the guide line may be on an external surface of the vertical section 324 of the main body 322 that is opposite the vertical section 326. In some embodiments, the guide line may also be on the upper surface of the horizontal section 326.

The guidance tool 320 also comprises a size parameter gts that is the distance from the center of the guidance channel 328 to the surface of the vertical section 322 facing the buccal plate during use. The size parameter indicates the size of the dental implant. Accordingly, there may be several guidance tools for use with different size implants. For dental implants, the size parameter gts may be about 4.5 mm, 5 mm or 5.6 mm, for example, that correspond with small, medium and large-sized dental implants. These dimensions are determined by different sizes for the diameter of the dental implants and the outer edge of the dental implant being about 3 mm from the buccal wall. Accordingly, for dental implants with 3.2 mm, 4 mm and 5.2 mm diameters, the values for the size parameter may be 3+3.2/2 mm, 3+4/2 mm and 3+5.2/2 mm, which are 4.6 mm, 5 mm and 5.6 mm, respectively.

Referring now to FIGS. 10A and 10B, shown therein is a partial perspective view and a cross-sectional view of the lower working model 252 of FIG. 9A with the guidance tool 320 during use. The guidance tool 320 is first positioned by positioning the vertical section 324 of the main body 322 of the guidance tool 320 to be adjacent to the buccal surface of the lower working model 252 near the dental implant site, while the horizontal section 326 of the guidance tool 320 rests on the crestal ridge of the dental implant site (i.e. at the location of the missing tooth that will be replaced). Using the numbers for the example embodiment given above, the depth indicator 330 is about 13 mm below the crestal ridge at the dental implant site.

The angle of the guidance channel 328 is then determined by adjusting the angle adjustor 332 so that the axis of the guidance channel 328 is aligned with the PCLC, which is also the longitudinal axis of the guidance channel 328 of the guidance tool 320 when the guidance tool 320 is in the proper position. As described previously, this angle is determined so that the dental implant will be positioned to obtain the correct occlusion with the opposing tooth from the opposing arch in use. In other words, the angle of the guidance channel 328 is adjusted until the guidance channel 328 is directly in line with the cusp (i.e. the designated cusp—DC) of the opposing tooth. The guide indicator 334 may be used to help line up the longitudinal axis of the guidance channel 328 of the guidance tool 320 with the DC and the PCLC.

Referring back to FIG. 7, the method 300 proceeds to 310 at which point a bore hole is created in the lower working model 252 at the dental implant site. Once the guidance tool 320 is positioned properly, a model pilot drill may be positioned using the guidance channel 328 of the guide tool 320 and a bore hole is drilled into the implant site at the lower working model 252. The guidance channel 328 will guide the model pilot drill through the POE to the CP thereby allowing for the creation of the proper angled bore hole in the lower working model 252. The model pilot drill is a drill used by a lab technician to create the guide bore holes in the lower working model 252.

Figure 10E:
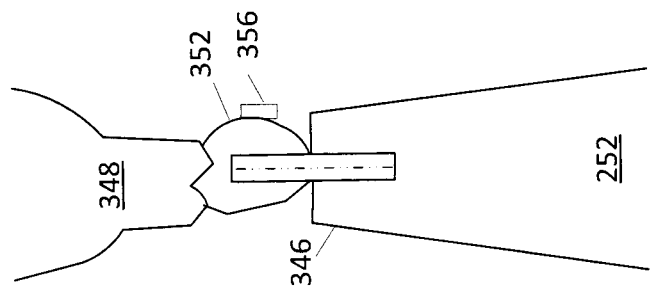
FIG. 10E is a cross-sectional view of a portion of the working model with the clone tooth in occlusion with the opposing tooth.
Figure 10D:
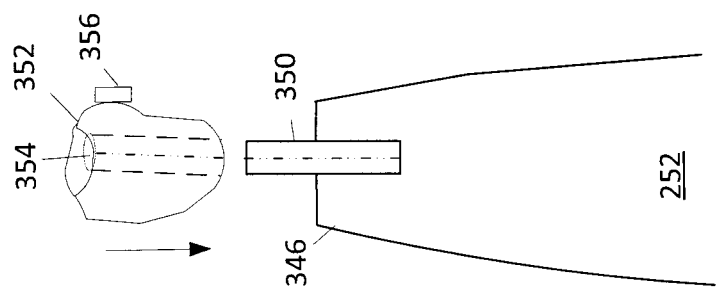
FIG. 10D is a cross-sectional view of the working model receiving a clone tooth.
Figure 10C:
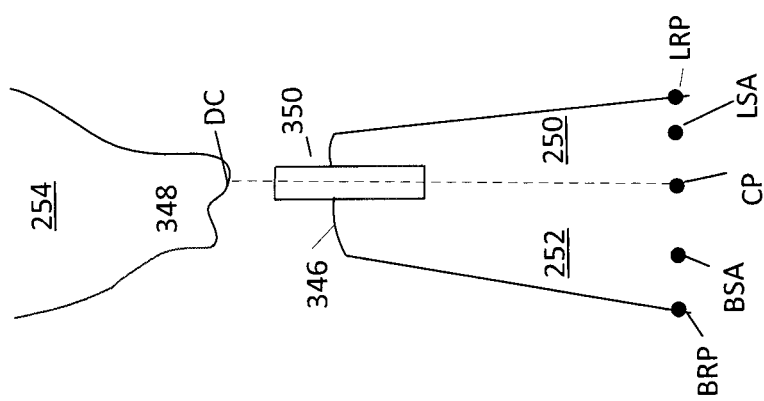
FIG. 10C is a cross-sectional view of a portion of the working model of FIG. 6B with a model post inserted at the implant site.

Once the bore hole is drilled into the implant site, a model post 350 is inserted into the bore hole as shown in FIG. 10C and a clone tooth 352 is mounted onto the model post 350 as in act 16 of the implant method 10 shown in FIG. 1. The clone tooth 352 is prefabricated to have a guide sleeve 354 for providing a guide channel and an attachment member 356 on an exterior surface of the clone tooth 352. During insertion, the model post 350 is received within the guide sleeve 354 of the clone tooth 352 as is shown in FIGS. 10D and 10E. The guide channel generally runs through the center of the clone tooth 352 and is meant to correspond with the occlusion axis (i.e. PCLC) when the clone tooth 352 is positioned on the lower working model 252. The clone tooth 352 is waxed into position so that the height of the clone tooth 325 with respect to the crestal ridge 346 at the implant site is just high enough so that the cusp of the clone tooth 352 engages the DC of the opposing tooth 348 (see FIG. 10E). After the clone tooth 352 is positioned, the working model 250 is tested to see if it results in the correct bite. If not, then adjustments may be made to the height and/or the orientation of the clone tooth 352.

One technique that may be used to wax the clone tooth 352 into position is as follows. The articulator 256 can be flipped over so that the clone tooth 352 slides down the model post and contacts the opposing tooth. The clone tooth 352 can then be rotated around the model post at this point to achieve the proper occlusal relationship with the opposing tooth. When the clone tooth 352 is in the proper position, the clone tooth 352 may be secured in place by using melted lab wax or another suitable material.

The clone tooth 352 is also positioned so that the attachment member 356 faces the lingual surface of the lower working model 252 and may be connected with any other clone teeth that will be used in the lower working model 252 as well as a template material so as to create a dental template that is used as a surgical guide during the dental implant procedure on the patient.

Acts 14 and 16 of the implant method 10 are performed for each dental implant that is required for the patient. In the example of FIG. 2, acts 14 and 16 will be performed three times because there are three dental implants that must be inserted into the patient's mouth.

It should be noted that in cases where there are two or more dental implants that have to be inserted at adjacent implant sites, such as implant sites 52 and 54 shown in FIG. 2, then the process described above for determining the orientation of a dental implant can be started at a first implant site that is beside an existing tooth and then repeated at a second implant site after the first clone tooth is inserted into the working model at the first implant site. The first clone tooth can then be used as the normal tooth was used in the positioning process described above. This can be repeated until all of the clone teeth have been positioned and inserted for all of the dental implant sites. Regardless of whether one or more adjacent dental implants are inserted, the dental implants may be inserted to so that the spacing between adjacent teeth in the working model is at about the inter-tooth spacing value which may be at least about 2 mm, for example, but may be different depending on the spacing of the existing teeth in the patient's mouth.

Figure 11A:
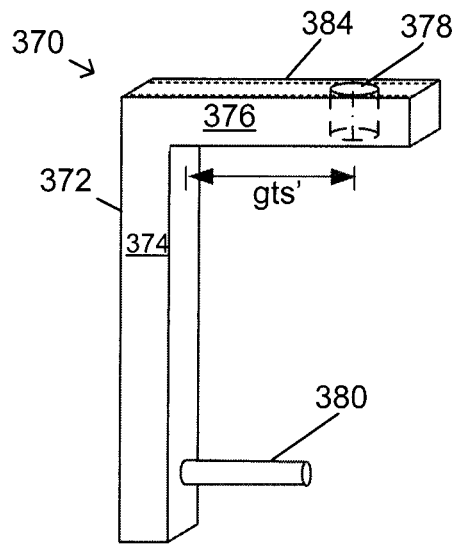
FIG. 11A is a perspective view of another example embodiment of a guidance tool.

Referring now to FIG. 11A, shown therein is a perspective view of another example embodiment of a guidance tool 370. The guidance tool 370 is similar to the guidance tool 320 in that the guidance tool 370 generally comprises a main body 372, and a depth indicator 380. The main body 372 includes a vertical section 374 and a horizontal section 376 which are generally similar to the corresponding sections 324 and 326 of the guidance tool 320. The horizontal section 376 has a vertical guidance channel 378 disposed near an end of the horizontal section 376 that is opposite the vertical section 374. However, in use, the guidance channel 378 may be used to receive a model post 350 for guiding the attachment of the model post 350 to the working model.

The depth indicator 380 is disposed on the main body 372 on the same side as the horizontal section 376 and is located to indicate a depth for the model post 350 and in some cases may be used to help angle the guidance tool 370 with respect to the buccal plate and the crestal surface of the jaw of the model so that the guidance tool 370 is positioned at a desired angle where an axis of the vertical guidance channel 378 is aligned with a reference point on an opposing structure (e.g. the designated cusp for dental implants) and a center point at the implant depth. The depth indicator 380 may generally be similarly shaped as the depth indicator 330 but the depth indicator 380 is longer since in this embodiment it also functions to help determine the angle of the PCLC.

The guidance tool 370 can be made in different sizes depending on the size of the dental implant(s) and the size of the patient's jaw. Therefore, the size parameter gts' may vary across different guidance tools. For instance, for someone with a wider jaw, the length of the depth indicator 380 is reduced. Different colors may be used to easily visually indicate the size of a particular guidance tool 370. For example, for a 4 mm implant, the guidance tool 370 may be red whereas for a 5.2 mm implant, the guidance tool 370 may be blue.

As with the guidance tool 320, the guidance tool 370 may also comprise a guide indicator 384 disposed on an exterior surface of at least one of the vertical and horizontal sections 374 and 376.

Figure 11B:
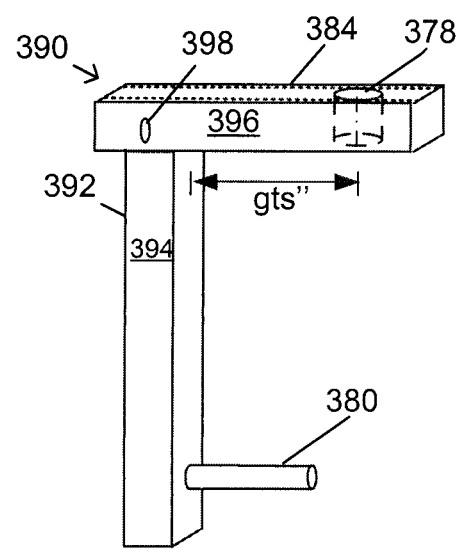
FIG. 11B is a perspective view of another example embodiment of a guidance tool.

Referring now to FIG. 11B, shown therein is a perspective view of another example embodiment of a guidance tool 390. The guidance tool 390 is similar to the guidance tool 370 except that the horizontal section 396 is releasably translatable with respect to the vertical section 394. For example, the horizontal section 396 may have a 90 degree clock-wise rotated downward facing C shape with inner facing edges or flanges which may engage grooves on the vertical section 394 allowing the horizontal section 396 to move with respect to the vertical section 394. An aperture 398 is included on adjacent surfaces of the vertical and horizontal sections 394 and 396 which allows the position of the horizontal section 396 to be fixed relative to the vertical section 394 by using a locking pin or some or suitable locking mechanism. Accordingly, the horizontal section 396 is releasably moveable with respect to an upper portion of the vertical section for adjusting the guidance tool for use with different size implants. In other words, the horizontal section 396 can move during use so that the guidance channel 378 can move closer to or farther away from the vertical section 394 thereby changing the value for the parameter gts" which may be done to accommodate dental implants of different sizes and/or patients with different size mouths. In some embodiments, the depth indicator 380 may also be moveable in addition to the horizontal section 396 for similar purposes. Therefore, the depth indicator 380 may comprise a length that corresponds to a size of the implant to allow for the guidance tool 390 to be adjusted to determine the desired angle.

It should be noted that both the guidance tools 370 and 390 may be used with a binding material that may be set once the model post 350 is inserted in its proper position. This is shown and discussed in more detail with regard to FIGS. 12 to 13D. For example, the binding material may be, but is not limited to, a settable epoxy resin.

Figure 11C:
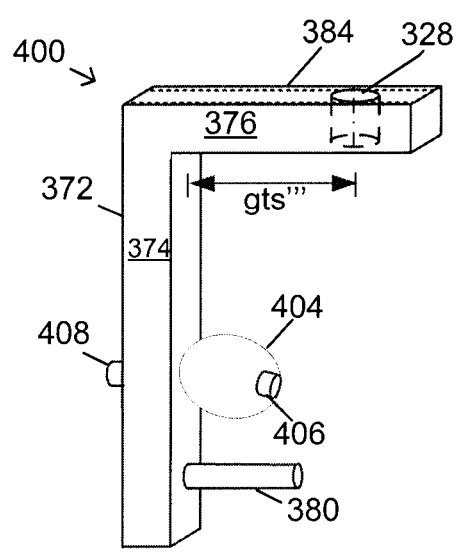
FIG. 11C is a perspective view of another example embodiment of a guidance tool.

Referring now to FIG. 11C, shown therein is a perspective view of another example embodiment of a guidance tool 400. The guidance tool 400 is similar to the guidance tool 370 except that the guidance tool 400 also includes a light source housing 404, a light source 406 and an activation button 408 that acts as a control input. The light source housing 404 is coupled to the vertical section and provides a housing for the light source 406 as well as the electrical circuitry and power source (such as a replaceable battery which may be or may not be rechargeable or some other adequate power source for example) that are needed to power and operate the light source 406 as well as couple the activation button 408 to the light source 406 to allow a user of the guidance tool to turn the light source on and off. Such electronic circuitry is known to those skilled in the art. It should be noted that in alternative embodiments, the shape of the guidance tool 400 may change. For example, the shape and location of the light source housing 404 and the light source 406 may vary depending on the application.

The light source 406 emits light at a certain wavelength which may be used to cure certain binding materials that are used such as light curable adhesive resin materials. Accordingly, this embodiment may be used to fix the model posts in place in addition with a light curable adhesive; this is described in more detail with regards to FIGS. 12 to 13D. For example, the binding material may be ultraviolet light curing epoxy and the light source 406 may be a US light source. The activation button 408 may act as a toggle switch so a user depresses the activation button 408 to activate and disable the light source 406. Alternatively, a user may have to keep depressing the activation button 406 to enable the light source 406.

It should be noted that the guidance tool 400 may be made to have different values for the size parameter gts'''. Once again, different colors may be used to visually indicate the size of a particular guidance tool 400. Alternatively, the light housing 404, light source 406 and the activation button 408 may be added to the guidance tool 390 to provide more flexibility since the horizontal section 396 may be releasably slid to adjust the size of the guidance tool.

Furthermore, it should be noted that the guidance tool 400 with an integrated light source allows for more precise positioning of the model post 350 since the person who is setting the model post 350 may use the same hand to hold the model post 350 in place as well as activate the light source 406 to cure the binding material. Furthermore, some ultraviolet curable binding material can cure within a matter of seconds (about 5 to 10 sec) which means that the model post 350 may be quickly and accurately mounted to the working model of the patient's dentition.

Figure 12:
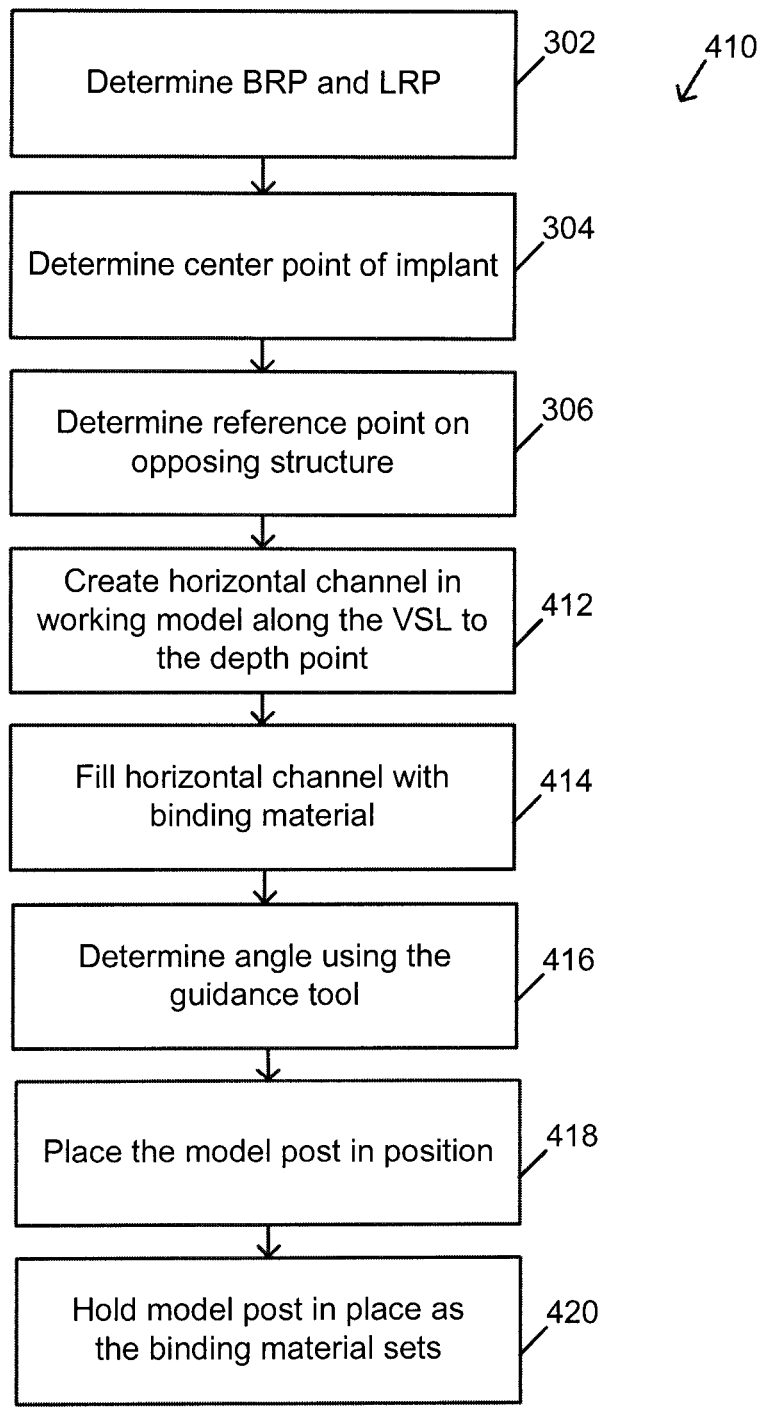
FIG. 12 is a flowchart of an example embodiment of a method for obtaining the position and angle for a model post for a dental implant.

Referring now to FIG. 12, shown therein is a flowchart of an example embodiment of a method 410 for obtaining the position and angle for the model post 350 for a dental implant. The method 410 is somewhat similar to the method 300 in that the BRP and the LRP are determined at 302, the CP of the implant is determined at 304, and a reference point on an opposing structure (e.g. the DC) is determined at 306 (each of these actions have been described for method 300 and will not be repeated here).

Once the reference point on the opposing structure has been determined, a horizontal channel 424 that may be shaped like a trough is created that includes the line connecting the points for the BRP, BSA, CP, LSA and LRP. In some embodiments, the horizontal channel 424 may be somewhat angled towards the reference point on the opposing structure. The horizontal position of the horizontal channel 424 along the patient's arch may be determined as was explained previously at act 302 of method 300. An example of a horizontal channel is given in FIG. 13A which shows a partial perspective view of a portion of the working model in an area where the patient requires a dental implant at. A horizontal channel 424 is formed along either side of the VSL, and extends downwards until the implant depth is reached and may extend from the buccal plate to the lingual plate of the jaw bone adjacent the implant site although there may be some embodiments in which this is not the case so that the horizontal channel may be angled upwards near the buccal and lingual plates so that the horizontal channel has an elliptical shape rather than the wedge-shape shown in FIGS. 13A to 13D. The horizontal 424 also has angled sidewalls towards the teeth on either side of the implant site and a certain width that is adequate to accommodate different angles that the model post 350 may be inserted at in order for the eventual dental implant to form a normal occlusion with the opposing tooth.

At 414, the horizontal channel 424 the horizontal channel 414 may be filed with binding material. In alternative embodiments, this may be done after act 418 in the model post 350 is held in place at the proper angle. The angle for the model post 350 may be determined using one of the guidance tools 370, 390 or 400. The guidance tool that is used depends on the binding material that is used in the horizontal channel 414. If the binding material is light curable then the guidance tool 400 may be used with a light source that provides light in the right wavelength region to cure the binding material. Alternatively, if the binding material otherwise sets on its own the guidance tool 370 or 390 may be used.

Various types of binding material may be used such as, but not limited to, ultraviolet light curing epoxy, curable liquid, a fast-setting liquid polyurethane plastic, an UV adhesive bond, or any other suitable material.

Figure 13A:
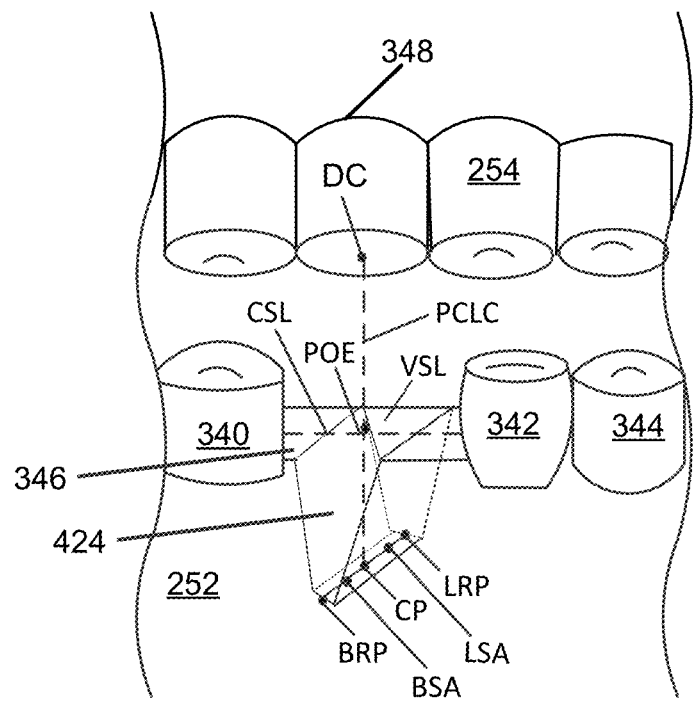
FIG. 13A is a partial perspective view of a portion of the working model in an area where the patient requires a dental implant at a stage of the method of FIG. 12 in which a guide channel is formed.
Figure 13B:
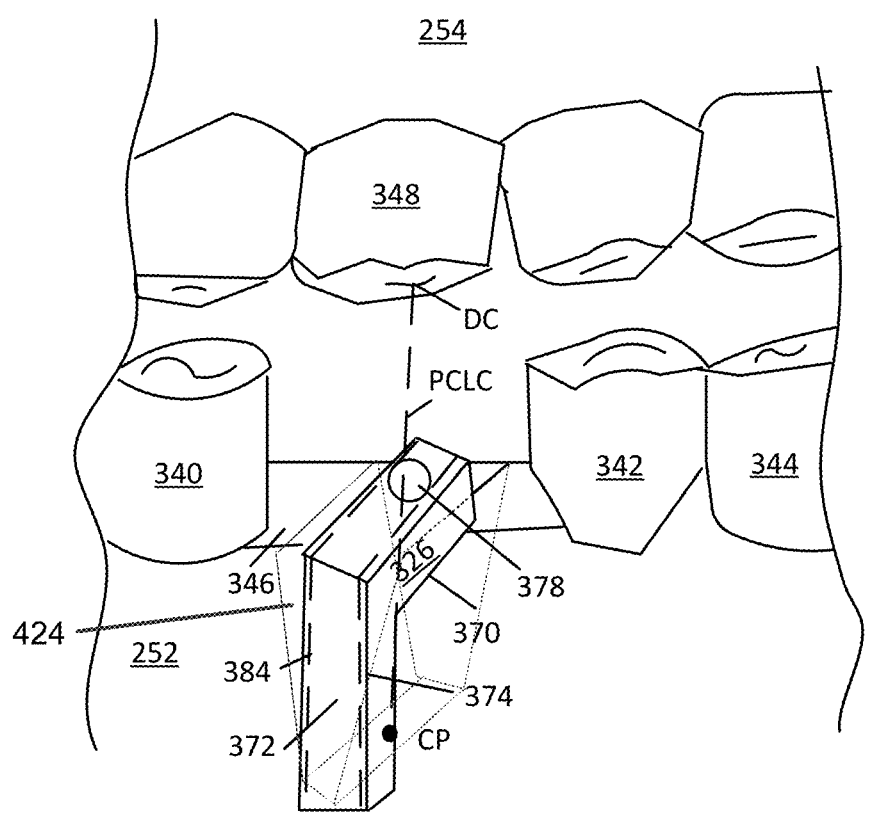
FIG. 13B is a partial perspective view of the working model of FIG. 13A with the guidance tool during use after the formation of the guide channel.

At 416, the angle for the model post 350 is determined so that the PCLC is in-line with the reference point (e.g. designated cusp) on the opposing tooth and the centre point at the implant depth as is shown in FIG. 13B.

Figure 13C:
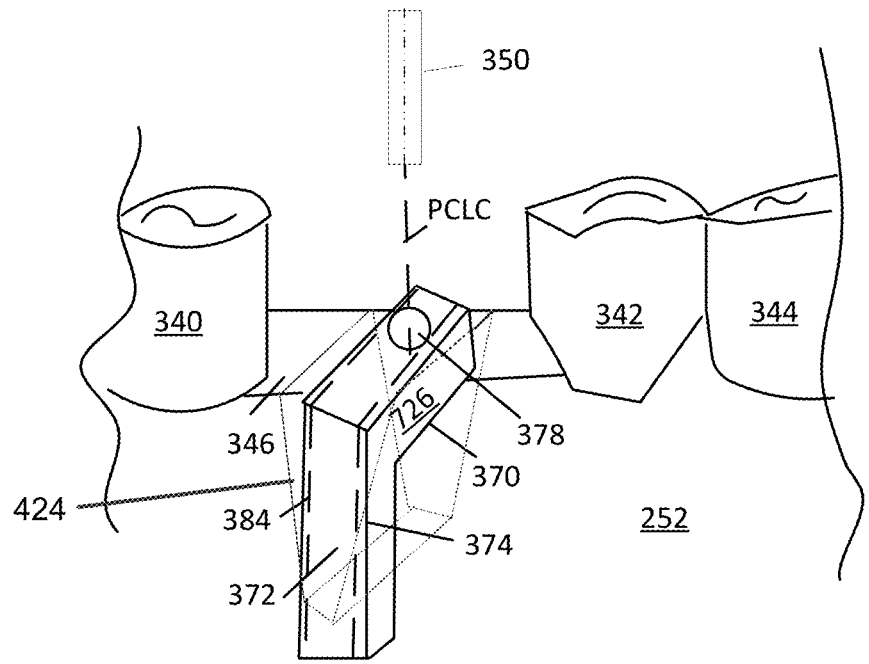
FIG. 13C is a partial perspective view of the working model of FIG. 13A with the guidance tool during use as a model post is being inserted into the working mode.
Figure 13D:
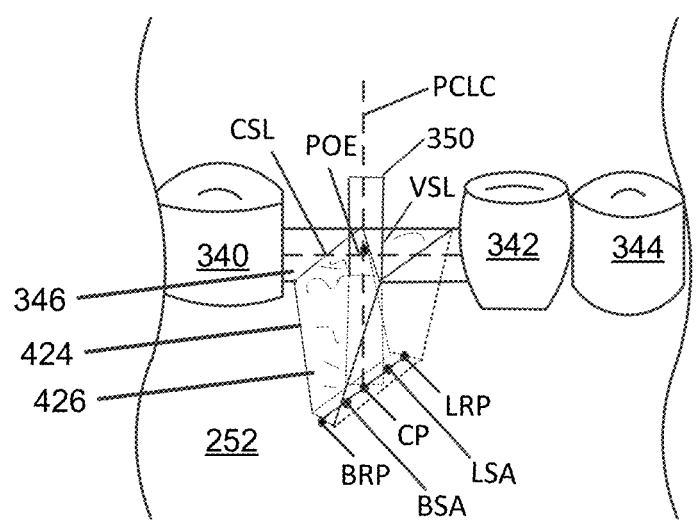
FIG. 13D is a partial perspective view of the working model of FIG. 13A with the guidance tool during use after a binding material has set.

At 418, once the angle for the model post 350 is determined the model post 350 is placed into position and held there until the binding material sets at 420. This may be done by sliding the model post 350 through the guidance channel 378 until it reaches the CP as is shown in FIGS. 13C and 13D. Depending on the binding material, it may set on its own or if it requires light for curing, then the light source 406 of the guidance tool 400 may be activated and kept on for a sufficient period of time for the binding material to set.

It should be noted that there may be an alternative embodiment in which one of the guidance tools 370, 390 and 400 may have an end portion which deploys the binding material, such as light curable epoxy.

Figure 14A:
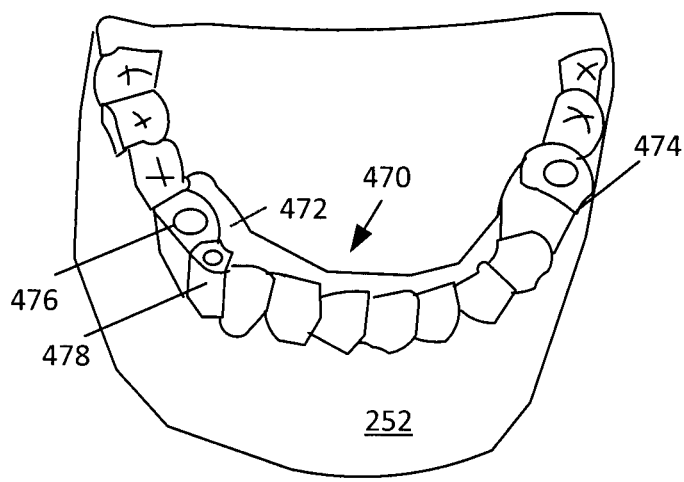
FIG. 14A is a perspective view of the lower arch of the working model with a dental implant having clone teeth at locations which will receive a dental implant.
Figure 14B:
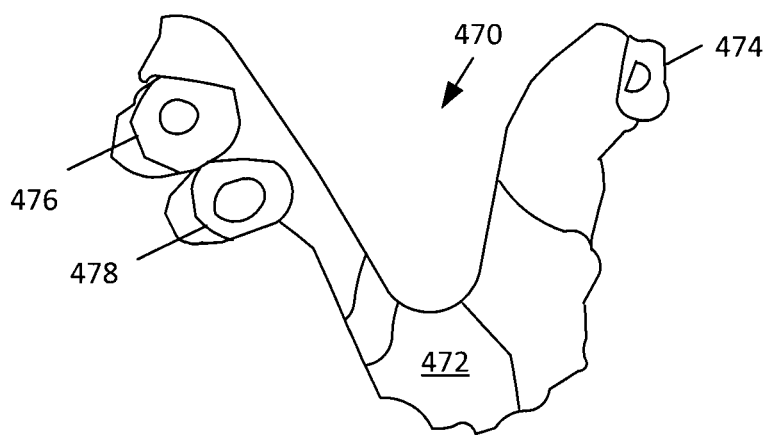
FIG. 14B is a top perspective view of the dental template of FIG. 14A.
Figure 14C:
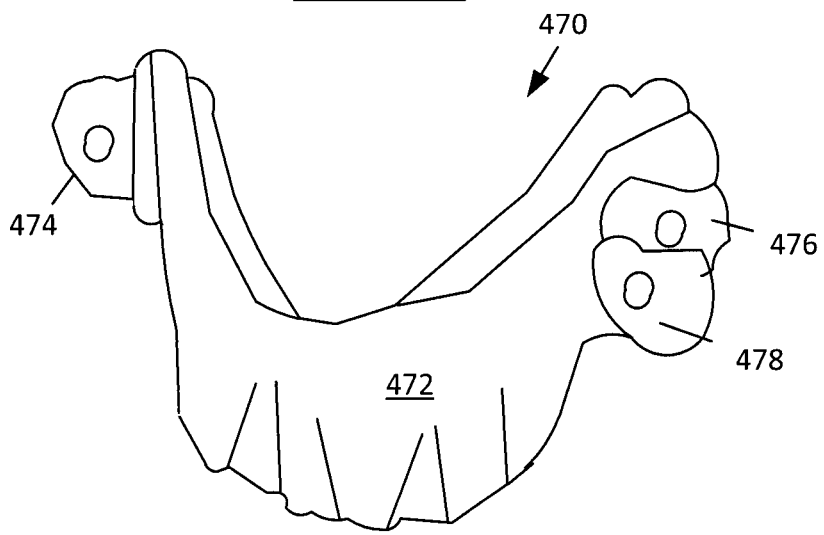
FIG. 14C is a bottom perspective view of the dental template of FIG. 14A.

Once all of the clone teeth have been positioned onto the lower working model 252, the implant method 10 proceeds to 18 at which point a dental template is created. An example dental template 470 is shown in FIGS. 14A to 14C that can be used for inserting the dental implants required for the patient's mouth shown in FIG. 2A. The dental template 470 comprises template material 472 and clone teeth 474 to 478. The template material 472 is shaped to correspond with the lingual surface of a portion of the teeth from the lower working model 252 surrounding the clone teeth so that the dental template 470 makes a perfect fit when it is inserted into the patient's mouth.

To create the dental template 470, an anti-adhesive material may first be placed along an inner surface of the arch of the lower working model 252 as well as an upper portion of the jaw bone adjacent to the lower arch. The anti-adhesive material is not placed on the lingual surface of the clone teeth 474 to 478. The anti-adhesive material may be any suitable material such as Vaseline, for example.

Next, a template material 472 for forming the dental template 470 is spread along the portions of the lower working model 252 that are covered by the anti-adhesive material as well as the lingual surfaces of the clone teeth 474 to 478 including surrounding and covering the attachment members of the clone teeth 474 to 478. A sufficient amount of the template material is used so that the resulting dental template 470 is sturdy and robust. Any suitable template material may be used such as, but not limited to, acrylic, for example.

The template material 472 is allowed to set. Once the template material 472 has set, the dental template 470 is removed from the lower working model 252. As can be seen in FIGS. 14B to 14C, the surface of the dental template 470 has grooves and indentations that correspond to the patient's lower arch surrounding the dental implant sites. This allows the dental template 470 to make a snug fit with the patient's existing teeth when inserted into the patient's mouth. When inserted into the patient's mouth, the dental template 470 will simulate the finished product, i.e. the dental implants. The occlusion and aesthetics will be very close to what it will actually be after the dental implants are inserted into the patient's mouth. Therefore the dental template 470 allows the patient to feel what the dental implants 474, 476 and 478 will feel like once they are installed which is advantageous for the patient since if there are any fit issues, they can be fixed on the dental template 470 before the actual dental implant insertion process has begun. While the dental template 470 is very stable and sturdy, it is made of material that has can be modified to change the shape of the dental template 470 to obtain a very good fit in the patient's mouth.

Referring once again to FIG. 1, once the dental template 470 is created, the implant method 10 proceeds to 20 at which point the dental template 370 is used to create bore holes in the patient's jaw bone for receiving the stem portion of the dental implants. The creation of the bore holes depends on the type of dental implants that will be used. An example of a method for creating bore holes for double-stemmed dental implants will now be discussed but this method can be modified for single-stemmed dental implants if desired.

Figure 15:
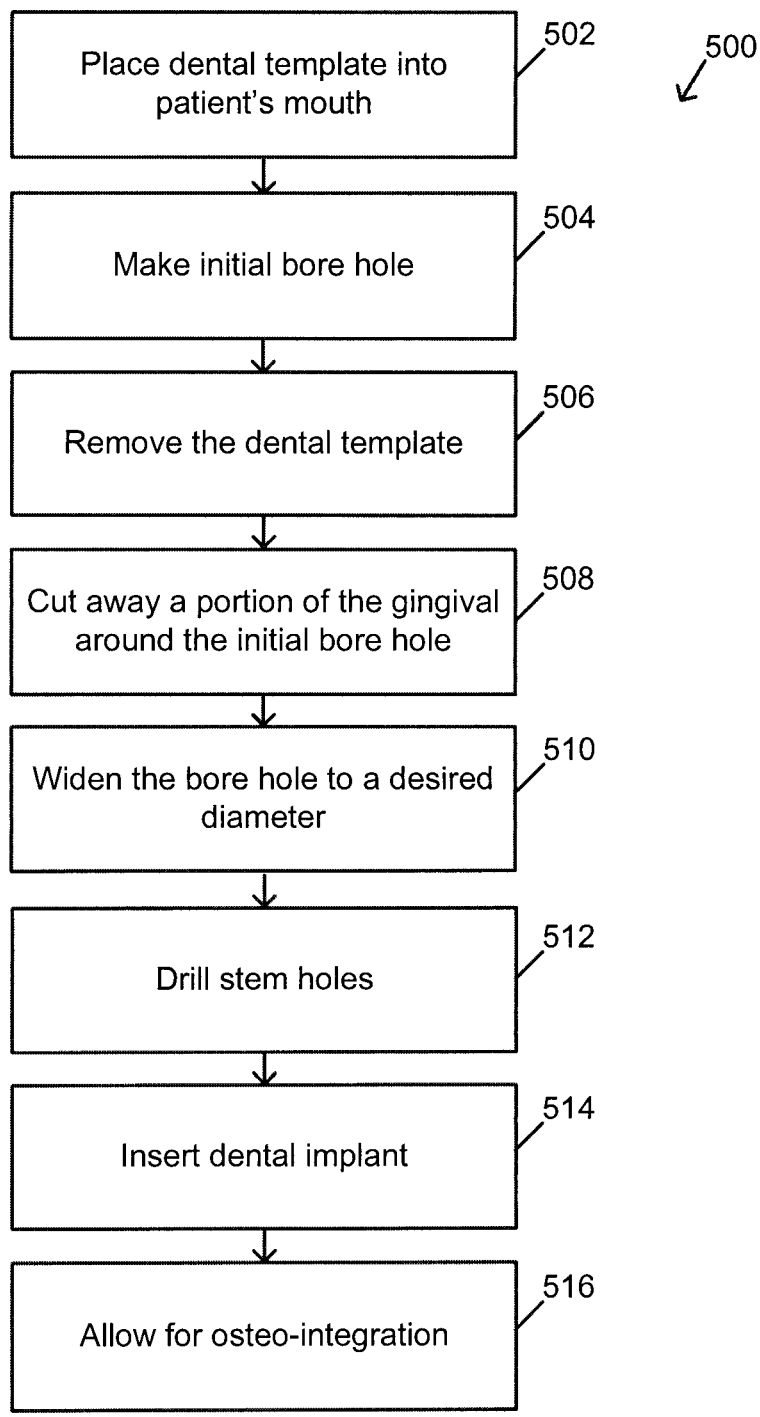
FIG. 15 is a flowchart diagram of an example embodiment of a method to insert a dental implant using a dental template such as that shown in FIGS. 14A to 14D.

Referring now to FIG. 15, shown therein is a flowchart diagram of an example embodiment of a method 500 to insert a dental implant using the dental template 470. FIGS. 16A to 16G are side views of one dental implant site at various stages of the method 500 when a dental implant having a dual stem is used. The method 500 may be modified when dental implants are installed that have other stem structures.

At 502, the dental template 470 is placed into the patient's mouth. The dental template 470 should fit very well at this point. At 504, a Surgical Pilot Drill (SPD) is used to make an initial bore hole 552 in the patient's jaw bone 554 (see FIG. 15A) using the guide sleeve of the clone tooth at the dental implant site as a guide channel for the SPD. At 506, the dental template 470 is removed after the initial bore hole 552 is made.

Figure 16A:
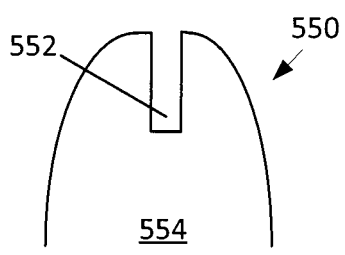
FIGS. 16A to 16F are cross-sectional views of the bore hole at various stages of the method of FIG. 15.
Figure 16B:
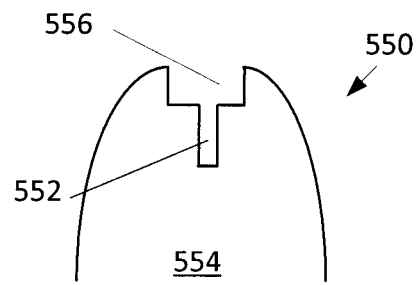
Figure 16C:
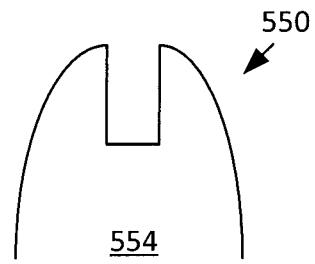
Figure 16D:
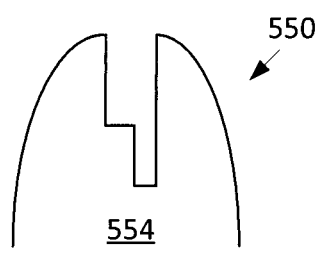
Figure 16E:
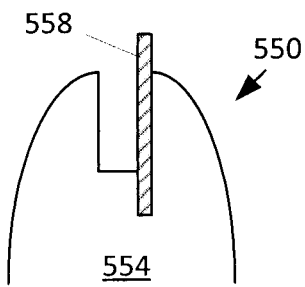
Figure 16F:
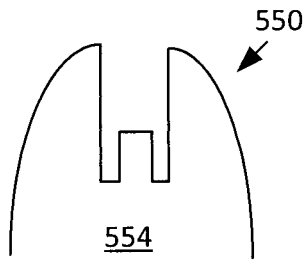
Figure 16G:
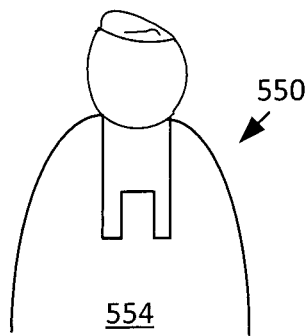
FIG. 16G is a cross-sectional view of the inserted dental implant.

At 508, a portion of the gingival area around the initial bore hole 552 is cut away using a larger drill bit such as a Gingival Circular Cutter (GCC) (see FIG. 16B). At 510, the bore hole 552 is widened to a desired diameter (see FIG. 16C) using a widening drill depending on the size of the dental implant.

At 512, one or more stem holes are drilled (the number of stem holes match the number of stems of the dental implant). A stem drill along with a Surgical Drill Jig (SDJ) is used to drill a first stem hole (see FIG. 16D). The surgical drill jig guides the stem drill during use. The stem drill is used by the surgeon to create deep channels for the stems for a dual-stemmed dental implant. A stabilizing pin 558 is then inserted into the first stem hole (see FIG. 16E) to stabilize the SDJ in order to create an accurate second stem hole. The stem drill and the SDJ are then used to create the second stem hole (see FIG. 16F).

At 514, the stem and core portion of the dental implant is inserted into the drilled holes and the dental implant is put in place such that the main body is just above the gum line (see FIG. 15G). At 516, the jaw bone is left to heal so that the stems of the implant fuse with the surrounding jaw bone in a process referred to as osteo-integration.

In an alternative, the body or crown portion of the dental implant may be installed at a later date depending on the type of dental implant that is used. Therefore, after the stems and core of the dental implant have been inserted in the jaw bone, a screw cap is placed on the core of the dental implant. Again, a sufficient amount of time is allowed to pass in order for osteo-integration to occur between the stem and core of the dental implant and the surrounding bone tissue. When sufficient osteo-integration has occurred, the screw cap is removed and the crown portion of the dental implant is installed.

Figure 17:
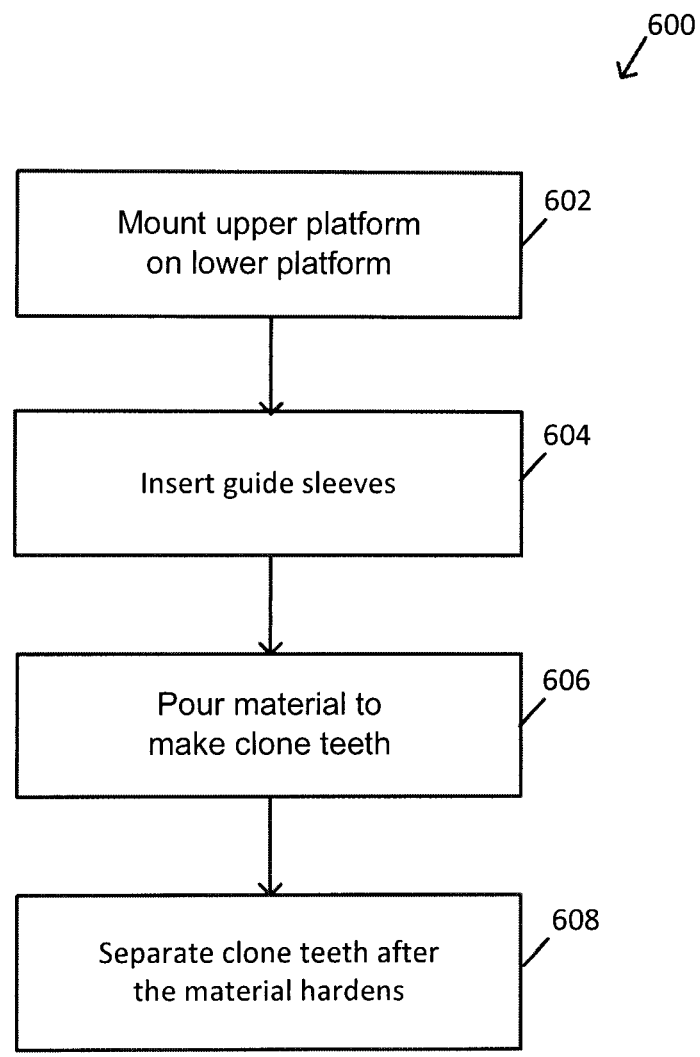
FIG. 17 is a flowchart diagram of an example embodiment of a fabrication method for fabricating clone teeth.

Referring now to FIG. 17, shown therein is a flowchart diagram of an example embodiment of a fabrication method 600 for fabricating clone teeth. As shown in FIGS. 11D, 11E, 18C and 18D, a clone tooth 352 is a replica tooth that has a main body having a tooth shape and a guide sleeve 354 directly in the center of its occlusal surface. The guide sleeve 354 has a guide channel that may extend down along a vertical axis of the clone tooth 352 in the most central area. The clone tooth 352 also has an attachment member 356 that is on an external surface of the main body of the clone tooth 352. The attachment member 356 allows for the clone tooth 352 to be more securely attached to a dental template when the dental template is being made.

In at least some embodiments, the attachment member 356 is connected to the guide sleeve 354. In other embodiments, the attachment member 356 may be attached to the exterior surface of the main body of the clone tooth 352.

In some embodiments, the clone tooth may be made from at least one of acrylic, ceramic, porcelain and metal, for example.

In some embodiments, the guide sleeve 354 and the attachment member 356 are made of at least one of metal and plastic respectively, for example.

Figure 18A:
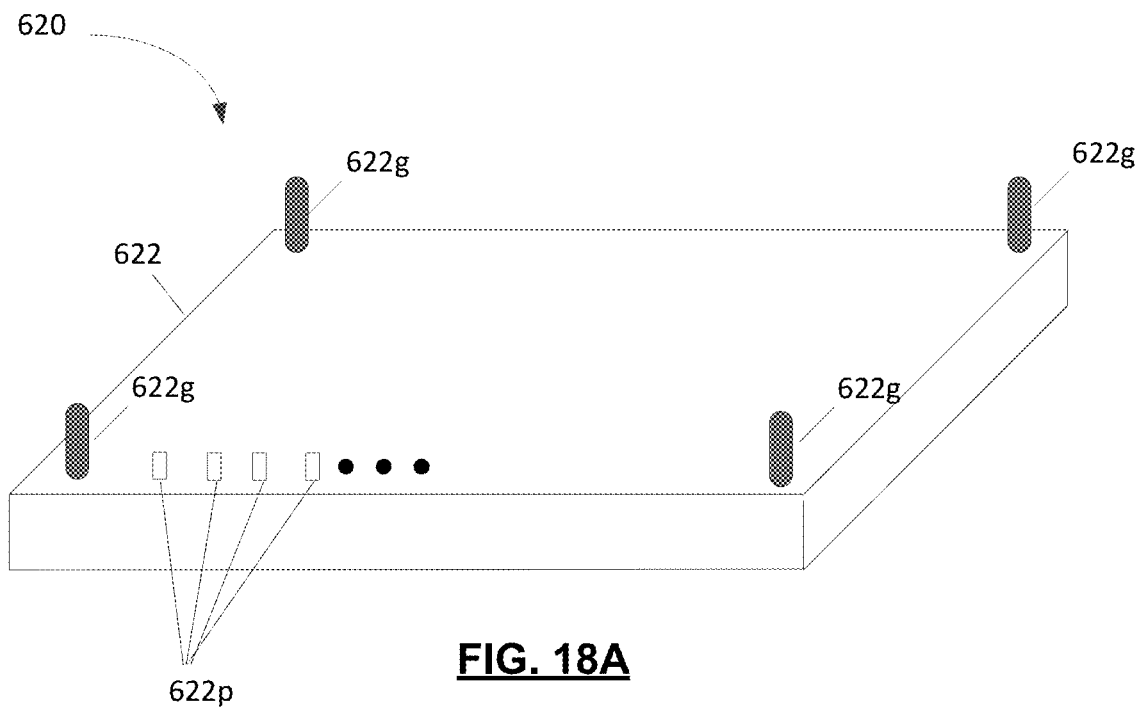
FIG. 18A is an upper perspective view of an example embodiment of a lower platform that may be used with an apparatus that fabricates clone teeth using the method of FIG. 17.
Figure 18B:
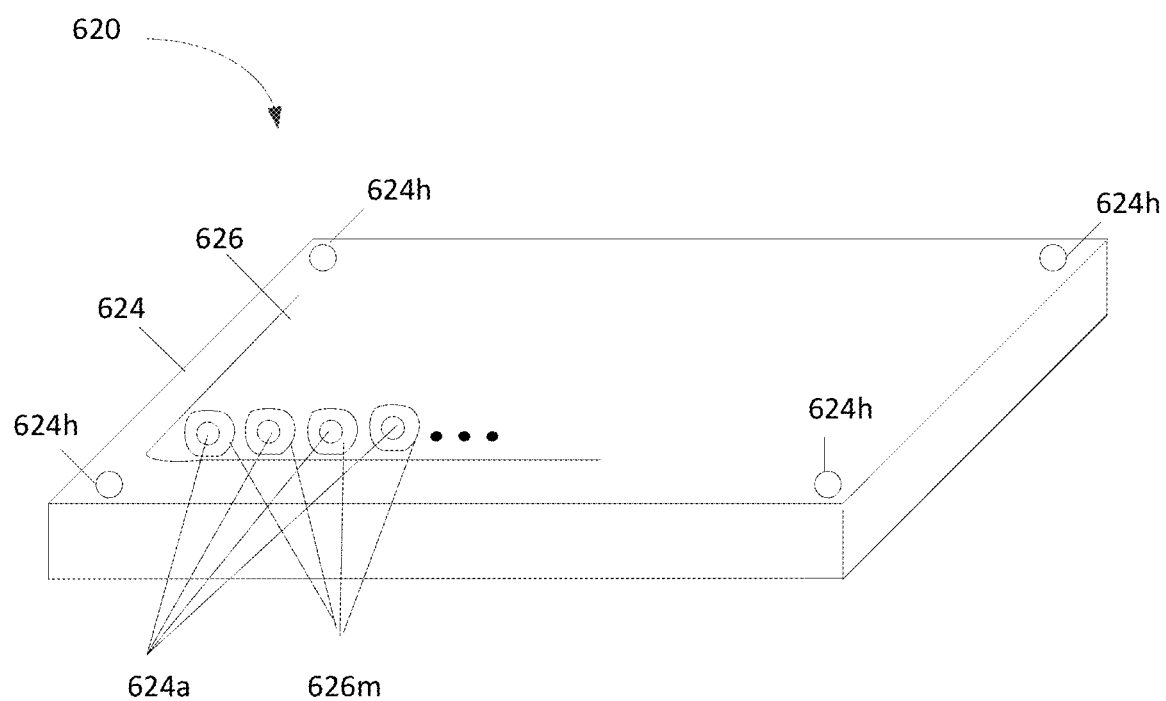
FIG. 18B is an upper perspective view of an example embodiment of an upper platform that may be used along with the lower platform of FIG. 18A.

An example embodiment of an apparatus 620 that may be used to fabricate clone teeth is shown in FIGS. 18A, 18B, 19A and 19B. FIG. 18A is an upper perspective view of a lower platform 622 of the apparatus 620 and FIG. 18B is an upper perspective view of an upper platform 624 of the apparatus 620.

The lower platform 622 includes at least three guide members 622g arranged in a first pattern. In this example, there are four guide members 622g arranged in a rectangular pattern. In another embodiment, the four guide members 622g may be arranged in a square pattern. In another embodiment, three guide members may be used that are in a triangular pattern. In other embodiments, more than four guide posts may be used and arranged in a suitable pattern so that the upper platform 624 can be securely releasably attached to the lower platform 522. The guide members 622g can be posts having a rod shape as shown in FIG. 17A. In other embodiments, other shapes can be used for the guide members 622g.

The lower platform 622 also includes a plurality of posts 622p that are arranged in a second pattern within the perimeter defined by the guide members and protruding from the upper surface of the lower platform 622. The posts 622p are spaced apart from one another to allow for clone teeth to form thereabout during use. Only a portion of the posts 622p are shown for ease of illustration. In this example, the posts 622p can also be arranged in a rectangular pattern or other pattern that may or may not be similar to the pattern used for the guide members 622g.

The upper platform 624 includes a plurality of guide holes 624h that are arranged in the pattern used for the guide members 622g and sized to allow the guide members 622g to pass therethrough during use. The number of guide holes 624h is the same as the number of guide members 622g.

The upper platform 624 also includes a plurality of apertures 624a arranged in the second pattern and being sized to allow the posts 622p to pass therethrough during use. A mould layer 626 or die is also disposed on the upper platform 624. The mould layer 626 has a plurality of teeth moulds 626m with each tooth mould being centered on one of the plurality apertures 624a and having a shape corresponding to a tooth for forming a clone tooth during use. The teeth moulds 626m have various shapes for forming different types of clone teeth (e.g. incisors, canines, molars, etc.) having different lengths. Accordingly, there can be different sets of teeth moulds 626m that have a particular shape and/or depth. Only a portion of the apertures 624a, the mould layer 626 and the teeth moulds 626m are shown for ease of illustration.

The apparatus 620 also uses a plurality of guide sleeves that are placed on the plurality of posts 622g after the upper platform 624 has been mounted onto the lower platform 622. The guide sleeves may have a rough or ribbed outer surface so that the material that is used to make the clone teeth forms a better bond with the guide sleeves. In this example, only guide sleeves 654a, 654b and 654c are shown for simplicity of illustration.

In some embodiments, each guide sleeve may further comprise an attachment member that extends from the guide sleeve such that after the clone teeth are formed, the attachment members protrude from an exterior surface of the clone teeth. Accordingly, in these embodiments these attachment members extend into a portion of the upper platform 622 just outside of the corresponding tooth mould.

In some embodiments, the guide sleeves may be made from metal or another suitable material.

In an example embodiment, the posts 622p may have an outer diameter of about 1.5 mm and the guide sleeves may have a corresponding inner diameter of about 1.5 mm. The length of the posts 622p can be in the range of about 5 mm to about 6 mm.

Referring once more to FIG. 17, at 602 of the fabrication method 600, the lower platform 622 is placed on a flat surface and the upper tray 624 is mounted onto the lower platform 622 such that the guide members 622g and the posts 622p from the lower platform 622 protrude through the corresponding holes 624h and apertures 624a in the upper platform 524.

At 604, a guide sleeve is placed on each of the posts 622p. An example of this act is shown in FIG. 19A in which the posts 622pa, 622pb and 622pc for clone teeth moulds 624ma, 624mb and 624mc slidably receive guide sleeves 354a, 354b and 354c, respectively. An example clone tooth 352 with guide sleeve 354 is shown in FIGS. 19C and 19D.

At 606, model material that is used to make the clone teeth is poured into the plurality of teeth moulds 626m and the model material is allowed to harden to form the clone teeth 352a to 356a as is shown in FIG. 18B.

At 608, the clone teeth are separated from the teeth moulds 626m. This may be done by removing the upper platform 624 from the lower platform 622 after the model material hardens and then removing the clone teeth by popping the clone teeth from the mould layer 626.

It should be noted that the guide sleeves 354a, 354b and 354c shown in FIGS. 19A and 19B do not have attachment members attached thereto in which case after the corresponding clone teeth are formed, the attachment members may be attached to an exterior surface of these clone teeth.

In an alternative embodiment, the mould layer 626 may comprise attachment member moulds that are adjacent to the teeth moulds 626m so that the attachment members may be formed using the model material, or if another material is used then after the model material is poured into the teeth moulds 626m, a mask may be placed over the mould layer 626 with holes for each of the attachment member moulds and a different material can be poured into the attachment member moulds and allowed to bond with the model material in order to form the clone teeth and along with the attachment members.

In an alternative embodiment, the guide sleeves 354a, 354b and 354c may already be coupled to the attachment members before introducing the plastic mould material. In some cases, a metal bracket may be used as the attachment member. The lingual metal brackets are attached to the sleeves 354a, 354b, . . . , 354n; the ensemble is inserted into the rubber mould 626m and the plastic mould material is poured over the tube and the bracket; When the plastic hardens the clone tooth is recovered from the mould; the guide tube is perfectly located in the center of the clone tooth and the attaching bracket extends out of the lingual wall. In other embodiments, the attachment member for the clone teeth may be a pin or a nail head.

It should be noted that some of the tools and methods described herein may be adapted for use with other types of dental implants or for bone implants for other body parts. For example, the dead reckoning process described herein may be modified for use with different stemmed dental implants. As another example, the dead reckoning process described herein may be modified for use with an artificial joint such as a hip joint or a knee joint, in which case the guidance tool performs the same function as was described for dental implants but may have a different shape. For a hip bone implant, one can determine a reference point on one side of the bone and align a parallel line to a point on the other side of the bone and then insertion points within the bone may be determined so that the hip implant is a certain distance away from both sides of the hip bone. The guidance tool can be used to help determine this alignment.

Various embodiments of systems, apparatus and methods that can be used for bone implants have been described herein by way of example only. For example, the apparatus and methods described herein may be used for dental implants but at least some of which may also be adapted for knee and joint replacement bone, and various types of bone anchored prosthesis.

While the applicant's teachings described herein are in conjunction with various example embodiments for illustrative purposes, it is not intended that the applicant's teachings be limited to such embodiments. On the contrary, the applicant's teachings described and illustrated herein encompass various alternatives, modifications, and equivalents, without departing from the spirit and scope of the example embodiments, which is limited only by the appended claims which should be given the broadest interpretation consistent with the description as a whole.

I claim:

1. A dental implant system for use with a patient, wherein the dental implant system comprises:
    a Deep Tissue Displacement (DTD) quadrant dental tray for making a mould of deep surface structure of jaw bone along a portion of an arch of the patient where the portion of the arch is encompassing a dental implant site;
    a guidance tool for determining orientation of a guide sleeve for a dental implant at a location on a working model of the patient's dentition where the location corresponds to the dental implant site that requires the dental implant, the working model comprising moulds where a first mould is made using the DTD quadrant tray and comprises the dental implant site and a second opposing mould is mounted in centric occlusion with the first mould, the guidance tool having:
        a main body including a single vertical section and a single horizontal section that is adjacent to the vertical section, the vertical and horizontal sections being coplanar with one another, the horizontal section having an abuting surface, a width that is narrower than a length of the dental implant site that is transverse to the crestal ridge and a height that is less than a height of a tooth that is adjacent to the dental implant site thereby allowing for the horizontal section of the guidance tool to be inserted between the first and second moulds and the abuting surface to slide along a portion of the working model at the dental implant site;
    at least one guidance sleeve for making a dental template for the dental implant site; and the DTD quadrant dental tray comprises:
- a support surface having first and second opposed sides with a curvature that corresponds to a quadrant of the patient's arch, the first and second sides being spaced apart to be wider than a portion of the jaw bone at the portion of the arch;
- a first side wall extending away from a first edge of the support surface and ending at a first ridge having a first contact surface that is at a first distance away from the support surface;
- a second side wall extending away from a second edge of the support surface and ending at a second ridge having a second contact surface that is at a second distance away from the support surface, and
- a tube-like portion that is disposed on an outer side surface at an upper end portion of at least one of the first and second side walls and the tube-like portion has a longitudinal axis that is laterally offset from the outer surface of the at least one of the first and second side walls and a diameter such that a lower surface of the tube-like portion extends towards a mid-point of the at least first and second side walls,
- wherein during use the tube-like portion as well as the first and second distances are large enough to cause the first and second contact surfaces to displace a portion of at least one of tissue and muscle on at least a buccal side of the portion of jaw bone to allow the mould to capture the deep surface structure of the portion of the jaw bone and the tube-like portion is adapted to reduce discomfort to the patient during displacement of at least one of the tissue and muscle.

2. The dental implant system of claim 1, wherein the first and second distances of the first and second side walls of the DTD quadrant dental tray are similar or different.

3. The dental implant system of claim 1, wherein at least one of the first and second side walls of the DTD quadrant dental tray are angled at greater than 90 degrees with respect to the support surface.

4. The dental implant system of claim 1, wherein the first and second side walls of the DTD quadrant dental tray have a width that increases at increasing distances from the support surface of the DTD quadrant dental tray.

5. The dental implant system of claim 1, wherein the horizontal section of the guidance tool is adjacent to an upper portion of the vertical section, the horizontal section of the guidance tool has a vertical guidance channel disposed near an end opposite the vertical section; and the guidance tool further comprises:
- a depth indicator disposed on the main body, the depth indicator being located to abut the working model to indicate a depth of the implant,
wherein, during use the vertical and horizontal sections of the guidance tool are placed adjacent a location on the working model that was formed using the DTD tray, where the location corresponds to the dental implant site, the depth indicator is located at the implant depth and the guidance tool is positioned at a desired angle where an axis of the vertical guidance channel is aligned to indicate a position for placement of a guide sleeve used to orient the dental implant where the guide sleeve has a longitudinal axis that is angled and aligned with a center point of the dental implant and a reference point on an opposing structure that represents an opposing tooth for the dental implant.

6. The dental implant system of claim 5, wherein the guidance tool further comprises an angle adjustor coupled to the main body, the angle adjustor being moveable to move the vertical section of the main body closer to or farther away from a side portion of the working model at the implant site to vary the angle of the guidance channel during use for determining an orientation for the guide sleeve.

7. The dental implant system of claim 6, wherein the angle adjustor is a set screw.

8. The dental implant system of claim 6, wherein the depth indicator comprises a protrusion that extends from a surface of the vertical section of the main body facing in the same direction as the horizontal section.

9. The dental implant system of claim 6, wherein the guidance tool further comprises a guide indicator disposed on an exterior surface of the main body to align the guidance channel with a designated point on a structure of the working model that opposes the implant site during use, the guide indicator comprises a pair of parallel guide lines having a spacing equivalent to a diameter of the guidance channel and disposed to align with opposing sides of the guidance channel.

10. The dental implant system of claim 9, wherein the guide indicator comprises a guide line that is aligned with a center of the guidance channel.

11. The dental implant system of claim 5, wherein the depth indicator comprises a length that corresponds to a depth of the implant to allow for the guidance tool to be adjusted to determine the desired angle.

12. The dental implant system of claim 5, wherein the horizontal section is releasably moveable with respect to an upper portion of the vertical section for adjusting the guidance tool for use with different size implants.

13. The dental implant system of claim 5, wherein the guidance tool further comprises a light source housing coupled to the vertical section, a light source disposed within the light source housing, a control input coupled to the light source to activate and deactivate the light source and electrical circuitry to couple the light source with the control input and a power source, wherein during use the light source is configured to shine a light at the implant site to cure light curable binding material at the implant site to hold a model post at the desired angle in order to build a dental template.

14. The dental implant system of claim 5, wherein the guidance tool comprises a size parameter that is a distance from a center of the guidance channel to the vertical section that indicates a size of the implant.

15. The dental implant system of claim 1, wherein the at least one guide sleeve is provided by at least one clone tooth, the at least one clone tooth comprising:
- a main body having a tooth shape;
- the guide sleeve disposed along a vertical axis of the main body; and
- an attachment member having an end disposed on an external surface of the main body, the attachment member allowing for attaching the clone tooth with a main body of a dental template during use.

16. The dental implant system of claim 15, wherein the attachment member is connected to the guide sleeve or the attachment member is attached to the exterior surface of the main body.

17. The dental implant system of claim 15, wherein the at least one clone tooth is made from one at least one of acrylic, ceramic, porcelain and metal and the guide sleeve and the attachment member are made of at least one of metal and plastic.

18. The dental implant system of claim 1, wherein each of the first and second distances are related to a depth at which structural detail is desired for the mould which depends on a type of dental implant to be used at the dental implant site and a size of the patient's jaw bone and surrounding tissue and muscle.

19. The DTD quadrant dental tray of claim 1, wherein the diameter of the tube-like portion is between a third to a half of a height of the at least one of the first and second side walls.

20. A Deep Tissue Displacement (DTD) quadrant dental tray for making a mould of deep surface structure of jaw bone along a portion of an arch of a patient's dentition encompassing a dental implant site, wherein the DTD quadrant dental tray comprises:
   a support surface having first and second opposed sides with a curvature that corresponds to a quadrant of the patient's arch, the first and second sides being spaced apart to be wider than a portion of the jaw bone at the portion of the arch;
   a first side wall having
      a first end adjacent to the first side of the support surface and
      a second end that is opposite the first end and has a first contact surface along a first ridge thereof, the first contact surface being located at a first distance away from the support surface;
   a second side wall having
      a third end adjacent to the second side of the support surface and
      a fourth end that is opposite the third end and has a second contact surface along a second ridge thereof, the second contact surface being located at a second distance away from the support surface; and
   a tube-like portion that is disposed at an outer surface of a side of an upper end portion of at least one of the first and second side walls, the tube-like portion extending along the outer surface of at least one of the first and second side walls and having a diameter that is more than half of a distance between the first and second side walls at the support surface,
wherein, the tube-like portion and the first and second distances are selected to cause the first and second contact surfaces to displace a portion of at least one of tissue and muscle on at least a buccal side of the portion of jaw bone to allow the mould to capture the deep surface structure of the portion of the jaw bone.

21. The DTD quadrant dental tray of claim 20, wherein each of the first and second distances are related to a depth at which structural detail is desired for the mould which depends on a type of dental implant to be used at the dental implant site and a size of the patient's jaw bone and surrounding tissue and muscle.

22. The DTD quadrant dental tray of claim 20, wherein the diameter of the tube-like portion is between a third to a half of a height of the at least one of the first and second side walls.

* * * * *